United States Patent
Tsuboi et al.

(10) Patent No.: US 7,751,108 B2
(45) Date of Patent: *Jul. 6, 2010

(54) MICRO-ACTUATION ELEMENT PROVIDED WITH TORSION BARS

(75) Inventors: Osamu Tsuboi, Kawasaki (JP); Yoshihiro Mizuno, Kawasaki (JP); Satoshi Ueda, Kawasaki (JP); Ippei Sawaki, Kawasaki (JP); Hisao Okuda, Kawasaki (JP); Fumio Yamagishi, Kawasaki (JP); Hiromitsu Soneda, Kawasaki (JP); Norinao Kouma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 35 days.

This patent is subject to a terminal disclaimer.

(21) Appl. No.: 11/987,899

(22) Filed: Dec. 5, 2007

(65) Prior Publication Data

US 2008/0285108 A1    Nov. 20, 2008

Related U.S. Application Data

(63) Continuation of application No. 11/101,519, filed on Apr. 8, 2005, now Pat. No. 7,324,251, which is a continuation of application No. PCT/JP02/010560, filed on Oct. 10, 2002.

(51) Int. Cl.
*G02B 26/08* (2006.01)
*H02N 1/00* (2006.01)
(52) U.S. Cl. .............. 359/224.1; 359/198.1; 359/199.2; 310/309
(58) Field of Classification Search .................. None
See application file for complete search history.

(56) References Cited

U.S. PATENT DOCUMENTS

| 5,583,688 | A  | 12/1996 | Hornbeck        |
|-----------|----|---------|-----------------|
| 5,740,150 | A  | 4/1998  | Uchimaru et al. |
| 5,966,009 | A  | 10/1999 | Asada           |
| 6,198,565 | B1 | 3/2001  | Iseki et al.    |

(Continued)

FOREIGN PATENT DOCUMENTS

EP    0 754 958    1/1997

(Continued)

OTHER PUBLICATIONS

Japanese Office Action issued on Apr. 21, 2009 in corresponding Japanese Patent Application 2004-542790.

(Continued)

*Primary Examiner*—James Phan
(74) *Attorney, Agent, or Firm*—Staas & Halsey LLP

(57) ABSTRACT

The micro-actuation element (X1) includes a movable unit (111), a frame (112) and a coupler (113) for connecting these, where the unit, the frame and the coupler are integrally formed in a material substrate having a multi-layer structure that consists of electroconductive layers (110a-110c), such as a core conduction layer (110b), and insulation layers (110d, 110e) intervening between the electroconductive layers (110a-110c). The movable unit (111) includes a first structure originating in the core conduction layer (110b). The frame (112) includes a second structure originating in the core conduction layer (110b). The coupler (113) includes a plurality of electrically separated torsion bars (113a, 113b) that originate in the core conduction layer (110b) and are connected continuously to the first structure and the second structure.

17 Claims, 14 Drawing Sheets

U.S. PATENT DOCUMENTS

| | | | |
|---|---|---|---|
| 6,262,827 B1 | 7/2001 | Ueda et al. | |
| 6,827,866 B1 | 12/2004 | Novotny | |
| 7,031,041 B2 | 4/2006 | Mi et al. | |
| 7,324,251 B2 * | 1/2008 | Tsuboi et al. | 359/224.1 |
| 2002/0114053 A1 | 8/2002 | Yasuda et al. | |

FOREIGN PATENT DOCUMENTS

| | | |
|---|---|---|
| GB | 2 275 787 | 9/1994 |
| JP | 7-287177 | 10/1995 |
| JP | 9-146032 | 6/1997 |
| JP | 9-146034 | 6/1997 |
| JP | 10-62709 | 3/1998 |
| JP | 2001-13443 | 1/2001 |
| JP | 2002-258205 | 9/2002 |
| JP | 2002-321196 | 11/2002 |
| JP | 2002-321197 | 11/2002 |
| JP | 2002-321198 | 11/2002 |
| WO | WO 01/48527 | 7/2001 |

OTHER PUBLICATIONS

U.S. Appl. No. 11/101,519, filed Apr. 8, 2005, Tsuboi et al., Fujitsu Limited, Kawasaki, Japan.

Osamu Tsuboi et al., "A Rotational Comb-Driven Micromirror with a Large Deflection Angle and Low Drive Voltage", Proceedings of the Fifteenth IEEE International Conference on Micro Electro Mechanical Systems, Jan. 2002, pp. 532-535, downloaded on Apr. 8, 2009 from IEEE Xplore.

Japanese Office Action issued on Apr. 21, 2009 in corresponding Japanese Patent Application 2004-542790.

Office Action mailed Mar. 6, 2007 in U.S. Appl. No. 11/101,519.

Notice of Allowance mailed Sep. 5, 2007 in U.S. Appl. No. 11/101,519.

* cited by examiner

FIG.11
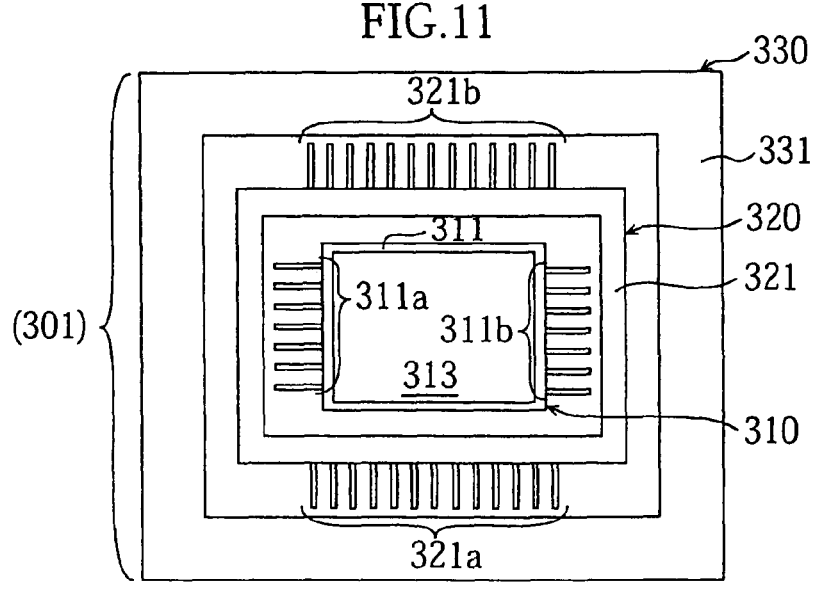
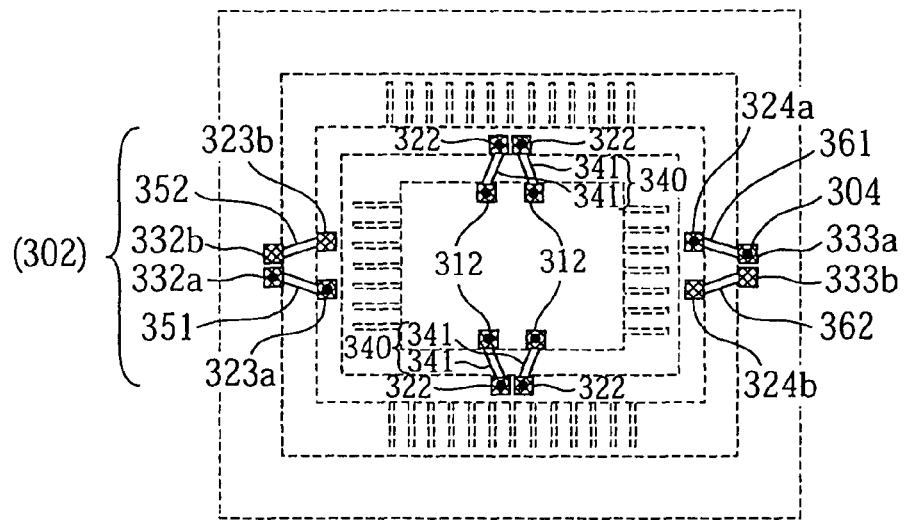
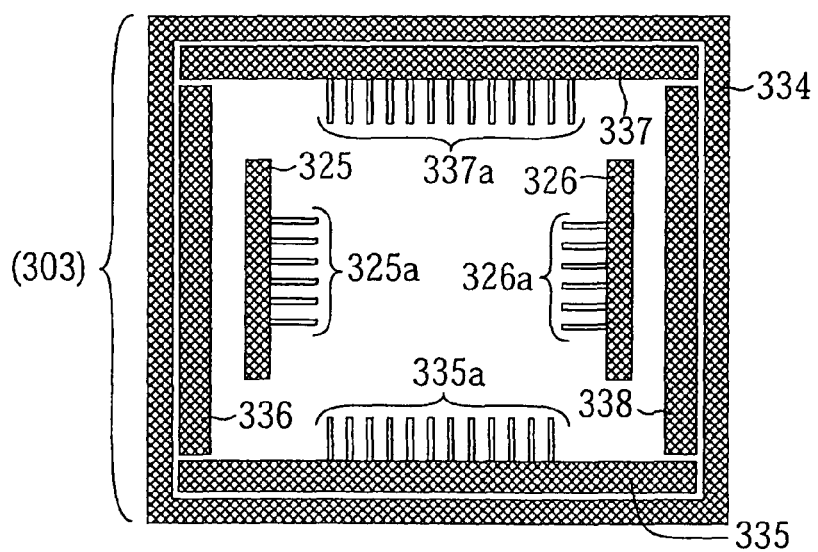

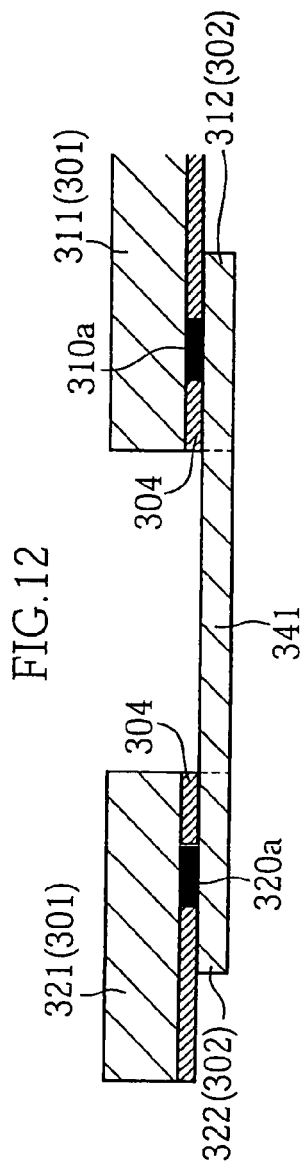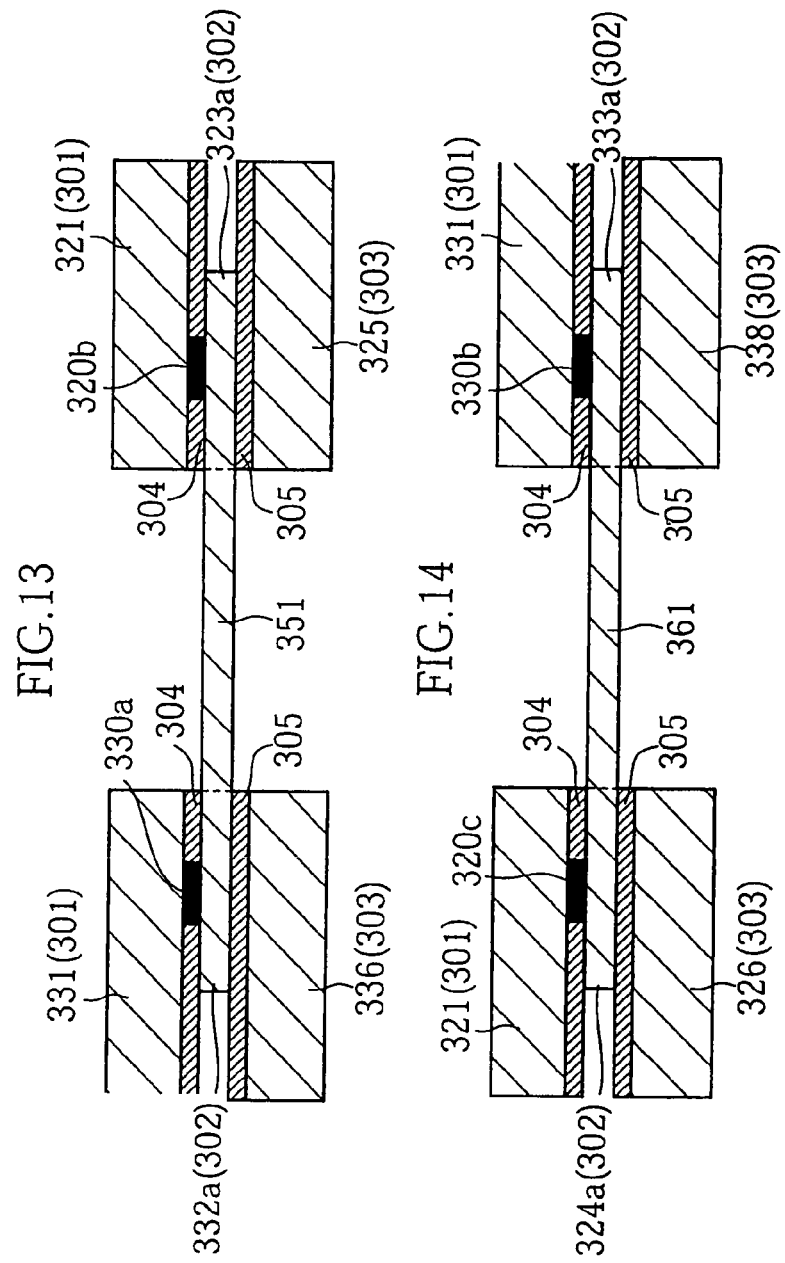

MICRO-ACTUATION ELEMENT PROVIDED WITH TORSION BARS

CROSS-REFERENCE TO RELATED APPLICATIONS

This application is a continuation of U.S. patent application Ser. No. 11/101,519, filed Apr. 8, 2005 now U.S. Pat. No. 7,324,251, which is a continuing application, filed under 35 U.S.C. §111(a), of International Application PCT/JP2002/010560, filed Oct. 10, 2002, the entire contents of which are incorporated herein by reference.

TECHNICAL FIELD

The present invention relates to a micro-actuation element provided with torsion bars. In particular, the present invention is a micro-mirror element used to change the direction of light progression by means of optical reflection, the element being built into a device such as an optical switching device which switches the light path among multiple optical fibers, and an optical disk device which accomplishes storage and playback processing of data onto an optical disk.

BACKGROUND ART

In recent years, optical communication technology has come to be broadly used in a variety of fields. In optical communications, optical signals are transmitted using optical fibers as a medium. In order to switch the optical signal transmission path from one fiber to another, generally use is made of a so-called optical switching device. In achieving good optical communication, as the properties sought for optical switching and the switching operation, there is a need for optical devices having large capacity, high-speed, and high reliability. From this perspective, as optical switching devices, there is heightened expectation relating to the combining micro-mirror elements manufactured by micromachining technology. By means of a micro-mirror element, switch processing can be accomplished between the input side optical transmission path and the output side optical transmission path in an optical switching device, using an optical signal in its existent state, without converting the optical signal to an electric signal, which is desirable in obtaining the above-noted properties.

The micro-mirror element is provided with a mirror surface to reflect light, which enables changing the direction of the light reflection by oscillating the mirror surface. Micro-mirror elements of the static electricity drive type which use electrostatic power to oscillate the mirror surface is used by many optical devices. A electrostatic drive micro-mirror element can be largely classified into two types, that is, a micro-mirror element manufactured by so-called surface micromachining technology and a micro-mirror element manufactured by so-called bulk machining technology.

With surface micromachining technology, a thin film material corresponding to each of the construction members is processed onto a substrate in a desired pattern, and by successively accumulating such a pattern, formation is accomplished of each of the members constructing elements such as a support body, a mirror surface and an electrode and the like, or a subsequently removed sacrificial layer. A electrostatic drive type micro-mirror element constructed by this type of surface micromachining technology is disclosed, for example, in JP-A-H07-287177.

On the other hand, with bulk micromachining technology, by etching the material substrate itself, a support body or mirror and the like can be formed into a desired shape, and the mirror surface or electrode can be formed into a thin film, in accordance with the need. The electrostatic drive type micro-mirror element manufactured by such bulk micromachining technology is disclosed, for example, in JP-A-H09-146032, JP-A-H09-146034, JP-A-H10-62709, and JP-A-2001-13443.

As one of the technical items required in a micro-mirror element, a mirror surface should have a high degree of flatness, to ensure light reflection. By means of surface micromachining technology, since the surface of a finally formed mirror is thin, the mirror surface is easily bent, and in assuring a high degree of flatness, the size of the mirror surface need have a length of several 10 μm.

On the other hand, according to bulk micromachining technology, a mirror portion is formed by subjecting a relatively thick material substrate to etching, and then a mirror surface is provided on this mirror portion. In this manner, even with a mirror surface having a wide surface area, rigidity can be assured. As a result, it becomes possible to form a mirror surface provided with a sufficiently high degree of optical flatness. Therefore, particularly with the construction of a micro-mirror element in which the mirror surface of the length of one border must be 100 μm or greater, bulk micromachining technology is widely adopted.

FIG. 18 and FIG. 19 show a conventional static drive type micro-mirror element 400 manufactured by means of bulk micromachining technology. FIG. 18 is an exploded perspective view of micro-mirror element 400, and FIG. 19 is a cross-sectional view taken along the line XIX-XIX of FIG. 18 in a micro-mirror element 400 in the assembled state. Micromirror element 400 has construction in which the mirror substrate 410 and the base substrate 420 form cumulative layers. The mirror substrate 410 is formed from a set of torsion bars 413 which connect the mirror 411 with the frame 412. Relative to a specific material substrate comprised of a silicon substrate and the like which has conductive characteristics, by etching from one of its sides, formation can be accomplished of the outer contour of a mirror 411, a frame 412 and a set of torsion bars 413. To the surface of the mirror component 411 is attached a mirror surface 414. To the rear surface of the mirror 411 is attached a set of electrodes 415a and 415b. To the base substrate 420 is attached an electrode 421a which faces the electrode 415a of the mirror 411, and an electrode 421b which faces the electrode 415b.

In the micro-mirror element 400, if an electric potential is applied to frame 412 of the mirror substrate 410, it is generally formed with the same conductive material as that of the frame 412. Electric potential is transmitted to the electrode 415a an electrode 415b through the set of torsion bars 413 and mirror 411. Furthermore, by applying a specific electric potential to the frame 412, electrification can ordinarily be accomplished, for example, of electrodes 415a and 415b. In this state, if a negative electric charge is applied to electrode 421a of the base substrate 420, then electrostatic attraction is generated between the electrode 415a and electrode 421a, and while twisting a set of torsion bars 413, the mirror 411 rotates in the direction of the arrow M1. If the mirror 411 vibrates until the sum of the twist resistance force of the torsion bars 413 and the electrostatic attraction between the electrodes reaches a point of equilibrium, then it stands still.

Instead of this, in a state in which the electrode 415a and the electrode 415b of the mirror 411 is positively charged, if a negative charge is applied to the electrode 421b, static attraction is generated between the electrode 415b and the electrode 421b, and the mirror 411 vibrates in a direction reverse of that of the arrow M1, and settles down. By means of the oscillating drive of the mirror 411, the reflection direction of the light reflected by the mirror surface 414 is switched.

In the micro-mirror element 400, however, the driving of the mirror 411, i.e., movable member, is performed by the application of only one electric potential. Specifically, if electric potential is applied to frame 412 of the mirror substrate 410, then the electric potential is transmitted to the mirror 411 through the set of torsion bars 413, and the mirror and 411 and the attached electrodes 415a and 415b come to have the same electric potential. In micro-mirror element 400, the application of different electric potential cannot be applied to the electrodes 415a and 415b to drive the movable unit. Owing to this, with the micro-mirror element 400, since the degree of freedom is low relative to the driving state of the movable unit, there is difficulty in realizing complex operations with the movable member. The conventional micro-mirror element 400 may fail to meet the requirements for an optical switching element built into an optical communications device, for example.

DISCLOSURE OF THE INVENTION

The present invention has been proposed under the circumstances described above, and therefore its object is to provide a micro-actuation element capable of realizing complex operations at its movable unit.

According to a first aspect of the present invention, there is provided a micro-actuation element, which includes a movable unit, a support frame and a coupler for connecting the unit and the frame. The unit, the frame and the coupler are integrally formed in a material substrate with a multi-layer structure comprising a plurality of electroconductive layers and insulation layers arranged between the electroconductive layers. The electroconductive layers include a core conduction layer. The movable unit comprises a first structure originating in the core conduction layer. The frame comprises a second structure originating in the core conduction layer. The coupler comprises a plurality of electrically separated torsion bars originating in the core conduction layer and continuously connected to the first structure and the second structure. According to the present invention, with respect to the movable unit and the frame, some arrangements originating in the same electroconductive layer are to be considered as providing a single structure, even if they are physically separated into several sections. Thus, in the movable unit, the first structure originating in the core conduction layer serves as a single assembly, if it consists of physically separated sections. Likewise, in the frame, the second structure serves as a single assembly.

The micro-actuation element having such construction is able to realize complex operations in the movable unit. The micro-actuation element according to the first aspect of the present invention is an element formed in a material substrate which has multi-layer construction, accomplished by a bulk micromachining technology such as MEMS (Micro-Electro-Mechanical Systems). The first construction of the movable unit, the second construction of the frame and the multiple torsion bars of the coupler continuously connected to these originate in a single conduction layer, namely, the core conduction layer. At the same time, the multiple torsion bars included in the single coupler are mutually electrically separated. Also, in the first construction and the second construction to which these are connected is formed with a conduction path in which there is no short-circuiting between the multiple torsion bars. Thus, in the micro-actuation element of the first aspect, it is possible for the transmission of multiple electric potentials to be connected from the frame to the movable unit through a single coupler.

For example, a first torsion bar selected from the multiple torsion bars may be connected to a first part of the first structure in the movable unit and to a first part of the second structure in the frame, while a second torsion bar selected from the multiple torsion bars may be connected to a second part of the first structure and to a second part of the second structure. In such an instance, different electric potentials can be transmitted from the frame to the movable unit via a single coupler.

Specifically, when electric potential is applied to the first part of the second construction, then electric potential is transmitted to the first part of the first construction through the first torsion bar, but is not transmitted to the second torsion bar nor the second part of the first construction to which the second torsion bar is connected. On the other hand, when electric potential is applied to the second part of the second construction, then the electric potential is transmitted to the second part of the first construction through the second torsion bar, but is not transmitted to the first torsion bar nor the first part of the first construction to which the first torsion bar is connected.

In this manner, in the micro-actuation element according to the first aspect of the present invention, multiple electric potentials can be transmitted, and it is possible to apply multiple electric potentials relative to the multiple parts of the movable unit. Thus, the micro-actuation element according to the first aspect has a degree of freedom with respect to the rotation of the movable unit around the axis defined by the coupler, and it is possible to realize complex operations in the movable unit. This type of micro-actuation element can be applied to built-in high-performance devices.

Preferably, the coupler includes two torsion bars offset in the width wise direction. The spacing of the two torsion bars is greater as the bars are closer to the movable unit. More preferably, when the spacing in the frame is Wf, the spacing in the movable unit is Wm, and the offset distance of the movable unit and the frame in the disposed location of the coupler is L, then the following inequalities $0<Wf<L$ and $Wf<Wm<Wf+4L$ are satisfied. With such an arrangement, it is possible to suppress inappropriate movement of the movable unit such as rotation of the movable unit in a virtual plane parallel to the rotational axis defined by the coupler.

In a micro-actuation element such as a micro-mirror element, it is often necessary to make the twist resistance of the coupler or torsion bars as small as possible. In order to set a low twist resistance of the coupler/torsion bar, conventionally the width or thickness of the torsion bar is made small. For example with the micro-mirror element 400 shown in FIG. 18 or 19, in order to reduce the twist resistance of the torsion bar 413, the width d1 or the thickness d2 of the torsion bar 413 is made small. However, by only making the width d1 or the thickness of the torsion bar 413 small, rotation of the mirror 411 around the normal N4 of the mirror surface 414 can occur. This being the case, in driving the mirror 411, not only the suitable rotation around the rotating axis A5 defined by the torsion bars 413, but also rotation around the normal N4 may occur. This obstructs precise control of the micro-mirror element 400.

According to the preferred embodiment of the present invention, the spacing of the two torsion bars of the coupler becomes larger as the bars are closer to the movable unit. Therefore even in the case where the thickness or width of each torsion bar is made small for reducing the twist resistance in the coupler, the inappropriate movement of the movable unit, such as rotation in a virtual plane parallel to the coupler-defined rotating axis, can be appropriately suppressed.

According to the first aspect of the present invention, the movable unit may include a movable core portion, a relay frame connected to the above-mentioned support frame through the coupler, and a relay coupler which connects the movable core portion and the relay frame. In this case, preferably the movable core portion may include a third construction which originates in the core conduction layer, the relay frame may include a first construction, and the relay coupler may include a plurality of electrically separated torsion bars that originate in the core conduction layer and are continuously connected to the third construction and the first construction. Further, the relay coupler may preferably include two relay torsion bars spaced from each other in the width wise direction, the spacing of the two relay torsion bars being greater as the bars are closer to the movable core portion. The micro-actuation element of the present invention may be constructed as a dual axis type.

In a preferred embodiment of the micro-actuation element according to the first aspect of the present invention, the movable unit is provided with a first comb-tooth electrode, and the frame is provided with a second comb-tooth electrode for moving the movable unit by generating static electricity between the first comb-tooth units. In case of constructing the dual axis type, the movable core portion is provided with another first comb-tooth electrode and the relay frame is provided with another second comb-tooth electrode for moving the movable core portion by electrostatic force generated in cooperation with the first comb-tooth electrodes. Driving the movable unit by means of comb-tooth electrode is preferable for controlling the movable unit with high precision. In another preferable embodiment, the micro-actuation element is further provided with a base facing the movable unit, the base being provided with a flat electrode facing the mirror. In this case, the movable unit may be provided with a flat electrode facing the flat electrode formed on the base. In another preferable embodiment, the micro-actuation element is further provided with a base which faces the movable unit, wherein a first magnetic coil is attached to the movable unit, and the base is provided with a magnetic coil or a magnet for moving the movable unit by electromagnetic force generated in cooperation with the first magnetic coil. In another preferable embodiment, a micro-actuation element is further provided with a base which faces the movable unit, wherein a magnet is attached to the movable unit, and the base is provided with an electromagnetic coil for moving the movable unit by electromagnetic force generated in cooperation with the magnet.

Preferably, the movable unit further includes a third construction which originates in the conduction layer connected to the core conduction layer through an insulation layer in the material substrate. At least a part of the third construction and a part of the first construction are electrically connected to each other by a conduction plug which passes through the intervening insulation layer. Such an arrangement is advantageous to realize proper formation of a conduction path in the movable unit.

Preferably the frame further includes a third construction which originates in the conduction layer connected to the core conduction layer through the insulation layer in a material substrate. At least a part of the third construction and a part of the second construction are electrically connected to the conduction plug which passes through the intervening insulation layer. Such an arrangement is advantageous to realize proper formation of a conduction path in the frame.

Preferably, the micro-actuation element includes a mirror provided on the movable unit for serving as a micro-mirror element.

According to a second aspect of the present invention, there is provided a micro-actuation element. This micro-actuation element includes a movable unit, a frame and a coupler for connecting the unit and the frame, wherein the unit, the frame and the coupler are integrally formed in a material substrate having a multi-layer structure that includes a first electroconductive layer, a second electroconductive layer, a third electroconductive layer, a first insulation layer intervening between the first and the second electroconductive layers, and a second insulation layer intervening between the second and the third electroconductive layers. The movable unit includes a first structure originating in the second electroconductive layer. The frame includes a second electroconductive layer originating in the second electroconductive layer. The coupler includes a plurality of electrically separated torsion bars that originate in the second electroconductive layer and are connected continuously to the first and the second structures.

The above-described micro-actuation element incorporates the features of the micro-actuation element according to the first aspect of the present invention. Thus, according to the second aspect of the present invention, the same advantages as those described above with respect to the first aspect can be enjoyed with the micro-actuation element, which is integrally formed in the multi-layered material substrate made up of a first electroconductive layer, a second electroconductive layer, a third electroconductive layer, a first insulation layer and a second insulation layer.

According to the second aspect, preferably, the movable unit includes a third construction which originates in the first conduction layer, and at least a part of the third construction and a part of the first construction are electrically connected by means of a conduction plug passing through the intervening first insulation layer. Such an arrangement is advantageous to realize proper formation of a conduction path in the movable unit.

Preferably, the movable unit includes a movable core portion, a relay frame connected to the support frame by the coupler, and a relay coupler connecting the movable core portion and the relay frame. The movable core portion includes a third structure originating in the first electroconductive layer and a fourth structure originating in the second electroconductive layer. At least a part of the third structure and at least a part of the fourth structure are connected to each other by a first conduction plug passing through the first insulation layer intervening between the third and the fourth structures. The relay frame further includes a fifth structure originating in the first electroconductive layer, the first structure originating in the second electroconductive layer and a sixth structure originating in the third electroconductive layer. At least a part of the fifth structure and a part of the first structure are connected to each other by a second conduction plug passing through the first insulation layer intervening between the fifth and the first structures. Another part of the first structure and at least a part of the sixth structure are connected to each other by a third conduction plug passing through the second insulation layer intervening between the first and the sixth structures. The relay coupler includes a plurality of electrically separated torsion bars that originate in the second electroconductive layer and are connected continuously to the fourth structure and the first structure. Such an arrangement is advantageous to realize proper formation of a conduction path in the movable unit of a dual axis micro-actuation element.

Preferably, the frame may further include a third structure originating in the first electroconductive layer and a fourth structure originating in the third electroconductive layer. At least a part of the third structure and a part of the second structure are connected to each other by a first conduction plug passing through the first insulation layer intervening between the third and the second structures. Another part of the second structure and at least a part of the fourth structure are connected to each other by a second conduction plug passing through the second insulation layer intervening between the second and the fourth structures. Such an arrangement is advantageous to realize proper formation of a conduction path in the frame.

According to a third aspect of the present invention, there is provided a micro-actuation element. This micro-actuation element includes a movable unit, a frame and a coupler connecting these. The unit, the frame and the coupler are integrally formed in a material substrate having a multi-layer structure that includes a first electroconductive layer, a second electroconductive layer, a third electroconductive layer, a first insulation layer arranged between the first and the second electroconductive layers, and a second insulation layer arranged between the second and the third electroconductive layers. The movable unit includes a first structure originating in the first electroconductive layer, a second structure originating in the second electroconductive layer and a third structure originating in the third electroconductive layer. At least a part of the first structure and a first part of the second structure are connected to each other by a first conduction plug passing through the first insulation layer intervening between the first and the second structures. A second part of the second structure and at least a part of the third structure are connected to each other by a second conduction plug passing through the second insulation layer intervening between the second and the third structures. The frame includes a fourth structure originating in the first electroconductive layer, a fifth structure originating in the second electroconductive layer and a sixth structure originating in the third electroconductive layer. At least a part of the fourth structure and a first part of the fifth structure are connected to each other by a third conduction plug passing through the first insulation layer intervening between the fourth and the fifth structures. A second part of the fifth structure and at least a part of the sixth structure are connected to each other by a fourth conduction plug passing through the second insulation layer intervening between the fifth and the sixth structures. The coupler includes a first torsion bar that originates in the second electroconductive layer and is connected continuously to the first part of the second structure and the first part of the fifth structure. The coupler also includes a second torsion bar that originates in the second electroconductive layer and is connected continuously to the second part of the second structure and the second part of the fifth structure.

The above-described micro-actuation element includes the features of the micro-actuation element according to the first aspect of the present invention. Thus, the same advantages as those described above with respect to the first aspect can be enjoyed with the element of the third aspect.

Specifically, according to the third aspect of the present invention, when electric potential is applied to at least a part of the fourth construction in the frame, then the electric potential is applied to at least a part of the first structure in the movable unit via the third conduction plug, the first part of the fifth structure, the first torsion bar, the first part of the second structure in the movable unit, and the first conduction plug. Likewise, when electric potential is applied to at least a part of the sixth construction in the frame, then the electric potential is applied to at least a part of the third construction in the movable unit by the fourth conduction plug, the second part of the fifth construction, the second torsion bar, the second part of the second construction in the movable unit, and the second conduction plug.

BRIEF DESCRIPTION OF THE DRAWINGS

FIG. 11 is an exploded plan view of the micro-mirror element shown in FIG. 10.

FIG. 12 is a cross-sectional view of part of the micro-mirror element shown in FIG. 10.

FIG. 13 is a cross-sectional view of another part of the micro-mirror element shown in FIG. 10.

FIG. 14 is a cross-sectional view of another part of the micro-mirror element shown in FIG. 10.

BEST MODE FOR CARRYING OUT THE INVENTION

Figure 1:
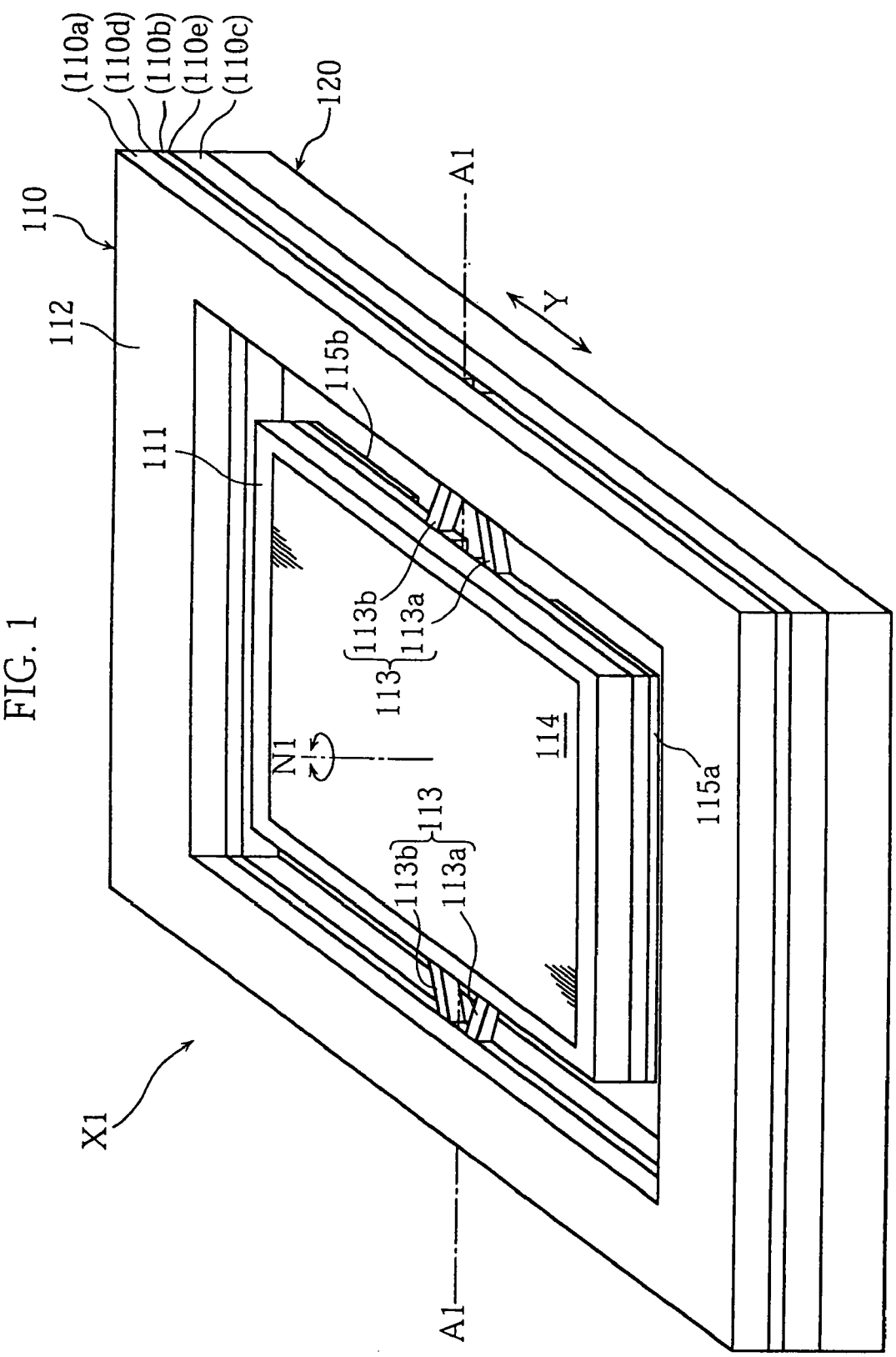
FIG. 1 is a perspective view showing a micro-mirror element according to a first embodiment of the present invention.
Figure 2:
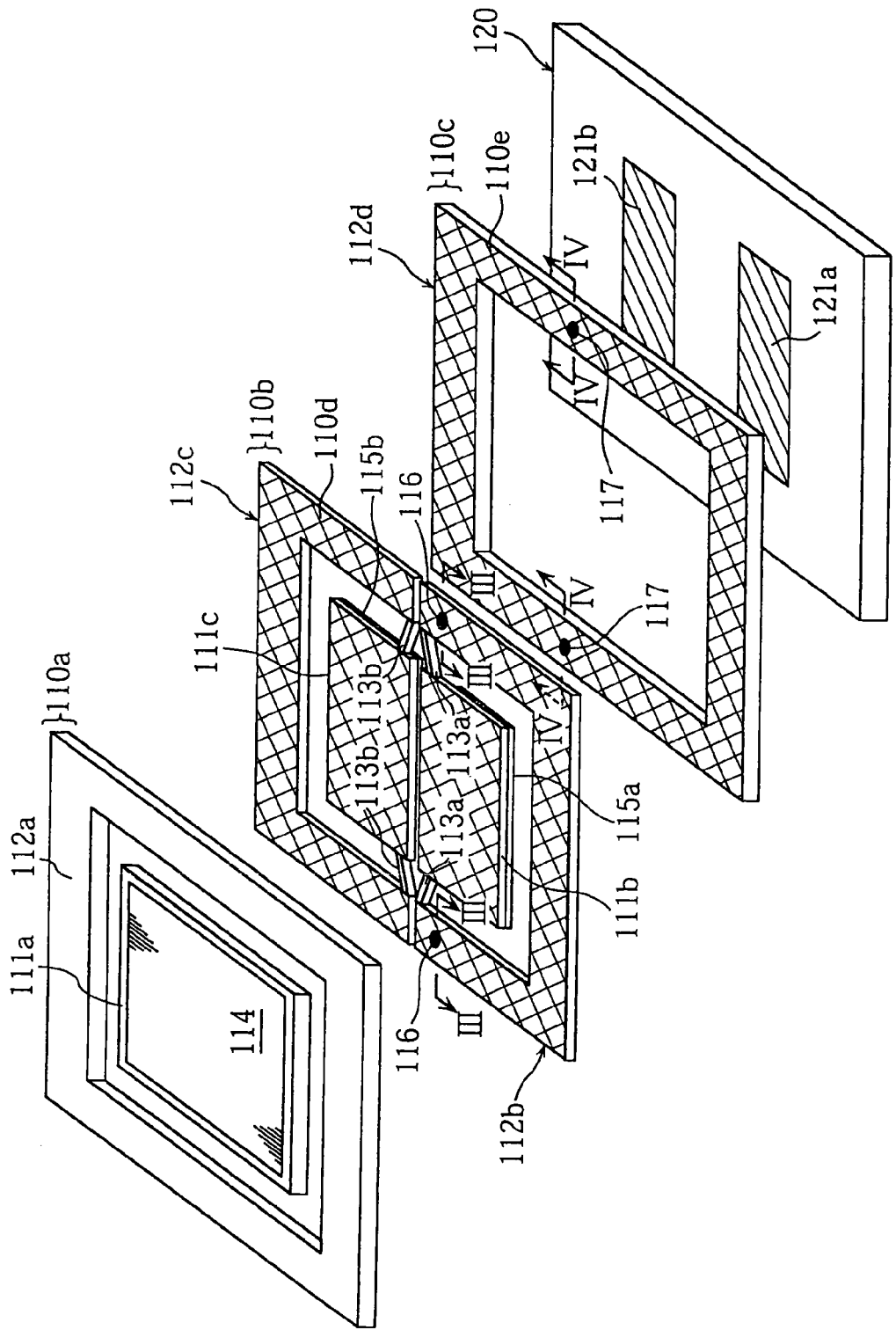
FIG. 2 is an exploded view of the micro-mirror element shown in FIG. 1.

FIG. 1 and FIG. 2 show a micro-mirror element X1 according to a first embodiment of the present invention. Micro-mirror element X1 has construction in which a mirror substrate 110 and a base substrate 120 are accumulated.

Figure 4:
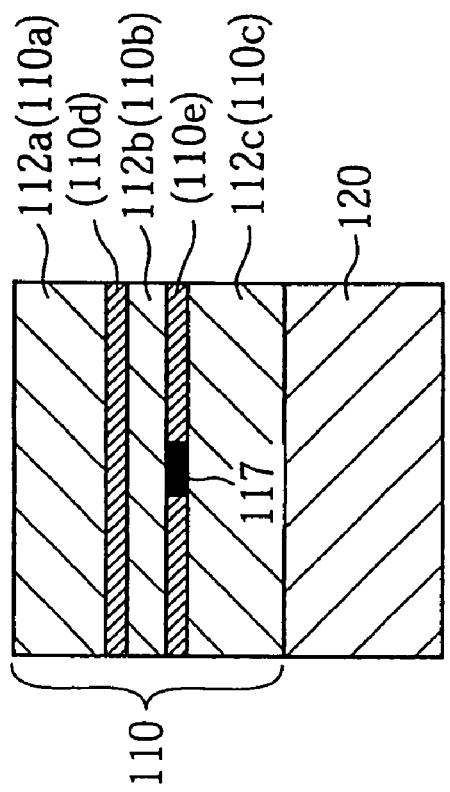
FIG. 4 is a cross-sectional view taken along the line in IV-IV FIG. 2.
Figure 3:
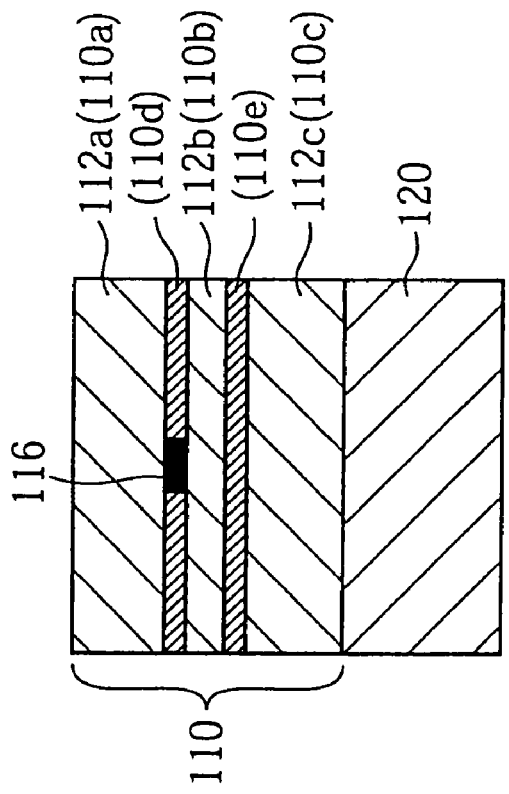
FIG. 3 is a cross-sectional view taken along the line III-III of FIG. 2.

Mirror substrate 110, as shown in FIG. 1, is provided with a mirror 111 and a frame 112 which encloses the mirror 111, and couplers 113 which connect the frame 112 and the mirror 111. The mirror substrate 110 is formed in a multi-layer material substrate by e.g. a bulk micromachining technology such as MEMS technology. The material substrate is provided with multi-layer construction formed from a first silicon layer 110a, a second silicon layer 110b, and a third silicon layer 110c as well as a first insulation layer 100d provided between the silicon layers, and a second insulation layer 110e, in which conductive characteristics are applied by doping an n type impurity of P or As; or a p type impurity of B and like. Multi-layer construction is shown in FIG. 3 and FIG. 4. The thickness of the first silicon layer 110a and the thickness of the third silicon layer 110c is, for example, 100 µm, and the thickness of the second silicon layer 110 b is, for example, 5 µm. The first insulation layer 110d and the second insulation layer 110e are, for example, provided with a thickness of 1 µm formed from oxidized silicon grown by means of the heat oxidation method on any of the first through third silicon layers 100a through 110c. The material substrate is appropriately multi-layered in the formation process of the mirror substrate 110.

In the formation of the mirror substrate 110, use is made of several etching masks, depending on the multi-layer structure of the material substrate, such as an etching mask for covering a part corresponding to the mirror 111, an etching mask for covering a part corresponding to the frame 112, and an etching mask for covering parts corresponding to the paired couplers 113. Then, each silicon layer is processed by the Deep RIE (Deep Reactive Ion Etching) method such as Si etching, or by KOH wet Si etching. Unnecessary members in the insulation layer are removed by etching. As a result, in the mirror substrate 110, formation is accomplished of a mirror 111, a frame 112, and a set of couplers 113. In the illustrated example, the distance between the mirror 111 and the frame 112, is for example, 10-200 µm.

The mirror 111, as is shown in FIG. 2, is provided with an upper layer 111a, and lower layers 111b and 111c. The upper layer 111a originates in the first silicon layer 110a, and the lower layers 111b and 111c originate in the second silicon layer 110b. Between the upper layer 111a and the lower layers 111b and 111c there is an intervening first insulation layer 110d. In FIG. 2, the first insulation layer 110d is depicted by cross hatching on a member originating in the second silicon layer 110b of the mirror substrate 110.

To the upper layer 111a of the mirror 111 is attached a mirror surface 114 used for optical reflection. The lower layers 111b and 111c are respectively formed with electrodes 115a and 115b. Mirror surface 114 and electrodes 115a and 115b are formed by the vapor deposition of a metallic film. However, in the case where conductivity of the second silicon layer is made to be adequately high by doping impurities, electrodes 115a and 115b need not be used.

As shown in FIG. 2, Frame 112 is provided with an upper layer 112a, middle layers 112b and 112c and a lower layer 112d. The upper layer 112a originates in the first silicon layer 110a, and the middle layers 112b and 112c originate in the second silicon layer 110b, and the lower layer 112d originates in the third silicon layer 110c. Between the upper layer 112a and the middle layers 112b and 112c, as seen in FIGS. 2-4, is an intervening first insulation layer 110d. Between the middle layers 112b, 112c and the lower layer 112c is an intervening second insulation layer 110e. In FIG. 2, the second insulation layer 110e is depicted by cross hatching on a member originating in the third silicon layer 110c of the mirror substrate 110.

In the frame 112, the upper layer 112a and the middle layers 112b, as seen in FIG. 3, are electrically connected by two plugs 116 which pass through the first insulation layer 110d. Each of the plugs 116 is formed, for example, from polysilicon filled between the upper layer 112a and the middle layer 112b. The middle layer 112c and the lower layer 112d, as shown in FIG. 4, are electrically connected by two plugs 117 which pass through the second insulation layer 110e. Each of the plugs 117 is formed, for example, from polysilicon filled between the middle layer 112c and the lower layer 112d.

Each coupler 113 connects the mirror 111 and the frame 112 to each other. The micro-mirror element X1 is constructed as a single axis type in which the movable unit or mirror 111 has only one rotating axis A1 defined by a pair of couplers 113. In the illustrated example, each coupler 113 consists of two torsion bars 113a, 113b spaced from each other.

As seen in FIG. 2, the torsion bar 113a, originating in the second silicon layer 110b, is formed integral with the lower layer 111b of the mirror 111 and with the middle layer 112b of the frame 112. In other words, the torsion bar 113a is continuously connected to the lower layer 111b and the middle layer 112b. Likewise, the torsion bar 113b, originating in the second silicon layer 110b, is formed integral with the lower layer 111c of the mirror 111 and with the middle layer 112c of the frame 112. In other words, the torsion bar 113b is continuously connected to the lower layer 111c and the middle layer 112c.

Figure 5:
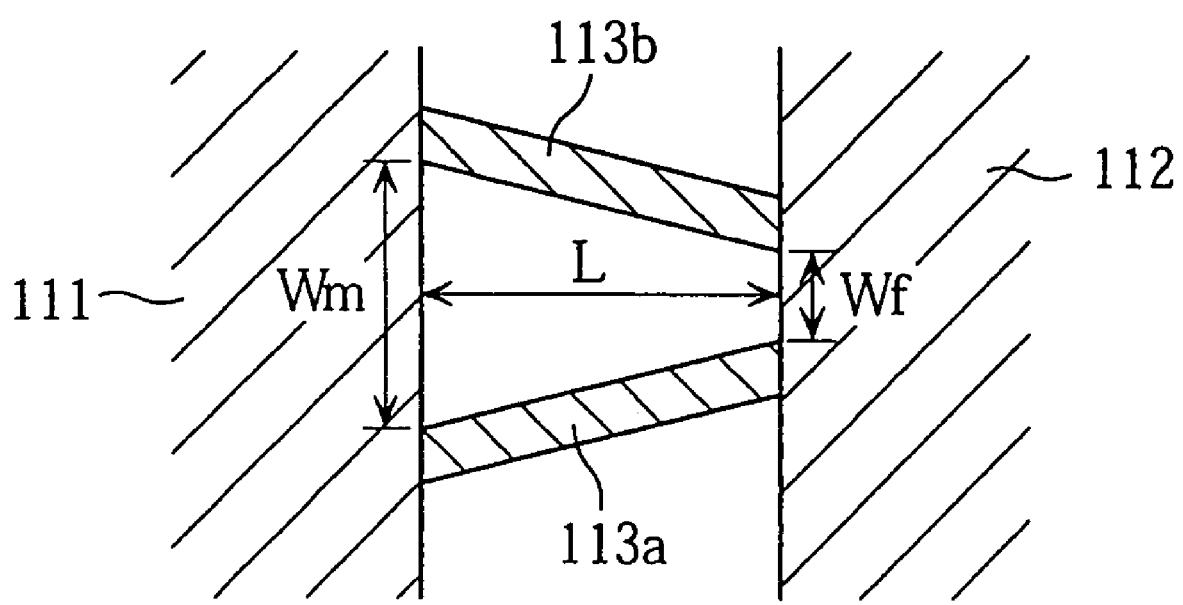
FIG. 5 is an enlarged plan view of part of the micro-mirror element shown in FIG. 1.

The two torsion bars 113a, 113b determines the width of the coupler 113 (the measurement in the Y direction in FIG. 1). Spacing between the two torsion bars 113a and 113b becomes larger as the bars are closer to the mirror 111, but gradually becomes smaller as closer to the frame 112a. As seen in FIG. 5, if spacing between the two torsion bars 113a, 113b in frame 112 is Wf, the spacing in the mirror 111 is Wm, and the separation distance between the mirror 111 and the frame 112 in the coupler 113 is L, then the torsion bars 113a and 113b are so arranged that the relationship 0<Wf<L, and Wf<Wm<Wf+4 L is satisfied. For example, if L is 100 µm then Wf is greater than 0 µm and less than 100 µm, and Wm is 100 µm or greater and less than 500 µm.

The base substrate 120 is constructed from, for example, a non-electroconductive silicon substrate. As shown in FIG. 2, a set of facing electrodes 121a and 121b are provided with appropriate spacing relative to the set of electrodes 115a and 115b of mirror 111. In other words, the micro-mirror element X1 is a so-called flat electrode type. Electrodes 121a and 121b comprise a part of the pattern formed wiring (parts other than the electrode are abbreviated in the drawing) in base substrate 120.

In an assembled state of the micro-mirror element X1, the lower layer 112d of the frame 112 and the base substrate 120 are connected to each other.

In the micro-mirror element X1, when a prescribed electric potential is applied to the upper layer 112a of the frame 112, then the electric potential is transmitted to the electrode 115a through the plug 116, middle layer 112b, torsion bar 113a and the middle layer 111b of mirror 111. In addition, when a prescribed electric potential is applied to lower layer 112d of the frame 112, then electric potential is transmitted to electrode 115b through plug 117, middle layer 112c, torsion bar 113b and middle layer 111c of mirror 111.

When the electric potential is applied to the electrode 115a of the mirror 111 and to the electrode 121a of the base substrate 120, electrostatic attractive force and electrostatic repulsive force is generated between the electrode 115a and the electrode 121a. Likewise, when the electric potential is applied to the electrode 115b of the mirror 111 and to the electrode 121b of the base electrode 120, electrostatic attractive force or electrostatic repulsive force is generated between the electrode 115b and the electrode 121b. By the combined force of these electrostatic forces, the mirror 111 rotates around the rotating axis A1 while twisting the set of couplers 113.

In the micro-mirror element X1, by means of the above-described drive mechanism, the mirror 111, namely the movable unit, is driven, and the mirror surface 114 can be faced in the desired direction. Accordingly, by means of the micromirror element 111, the reflection direction of light reflected by the mirror surface 114 can be switched to the desired direction.

In the micro-mirror element X1, the two torsion bars 113a, 113b included in a single coupler 113 are electrically separated from each other. Further, the mirror 111 and the frame 112, to which these bars are connected, are formed with an electroconductive path arranged not to give rise to short-circuiting between the torsion bars 113a and 113b. Owing to this, in the micro-mirror element X1, multiple electric potential can be transmitted relative to the mirror from the frame 112, so that different electric potentials are simultaneously applicable to the mirror 111. As a result, the micro-mirror element X1 is provided with a high degree of freedom of the rotating drive of the mirror 111 around the rotating axis A1 defined by the coupler 113, whereby fine adjustment is possible for properly controlling the movement of the mirror 111.

In addition, in the micro-mirror element X1, by constructing the coupler 113 so that the torsion bars 113a 113b are sufficiently small, the twist resistance of the coupler 113 is reduced. With a small amount of twist resistance, the mirror 111 can be driven with a high degree of precision. At the same time, the pacing of the separated torsion bars 113a and 113b in the width direction of the coupler 113 is such that the spacing Wm in the mirror 111 is greater than the spacing Wf in the frame 112. The coupler 113 having such construction is small in twist resistance, but effective in preventing the mirror 111 from rotating around the normal N1.

The mirror 111 of the micro-mirror element X1 may be driven by electromagnetic force from an electromagnetic coil or permanent magnet in place of the electrostatic force caused by the flat electrodes. Specifically, the electrodes 115a, 115b of the mirror 111 may be replaced by an electromagnetic coil, and the electrodes 121a, 121b of the base substrate may be replaced by an electromagnetic coil or a permanent magnet. Alternatively, the electrodes 115a, 115b of the mirror 111 may be replaced by a permanent magnet, and the electrodes 121a, 121b of the base substrate may be replaced by an electromagnetic coil. With this arrangement, the mirror 111 can be driven by adjusting the state of electricity passing to the electromagnetic coil.

Figure 6:
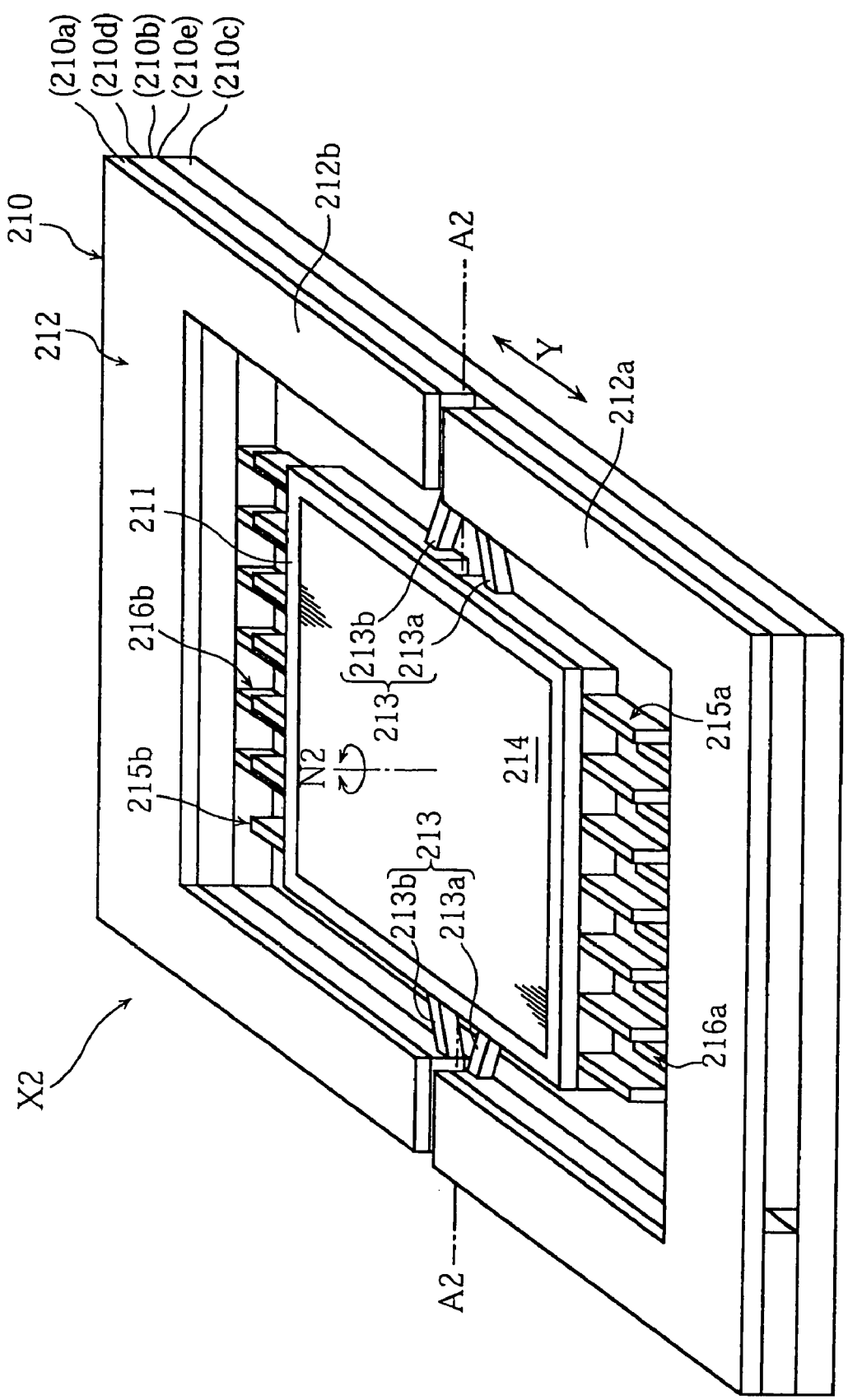
FIG. 6 is a perspective view showing a micro-mirror element according to a second embodiment of the present invention.
Figure 7:
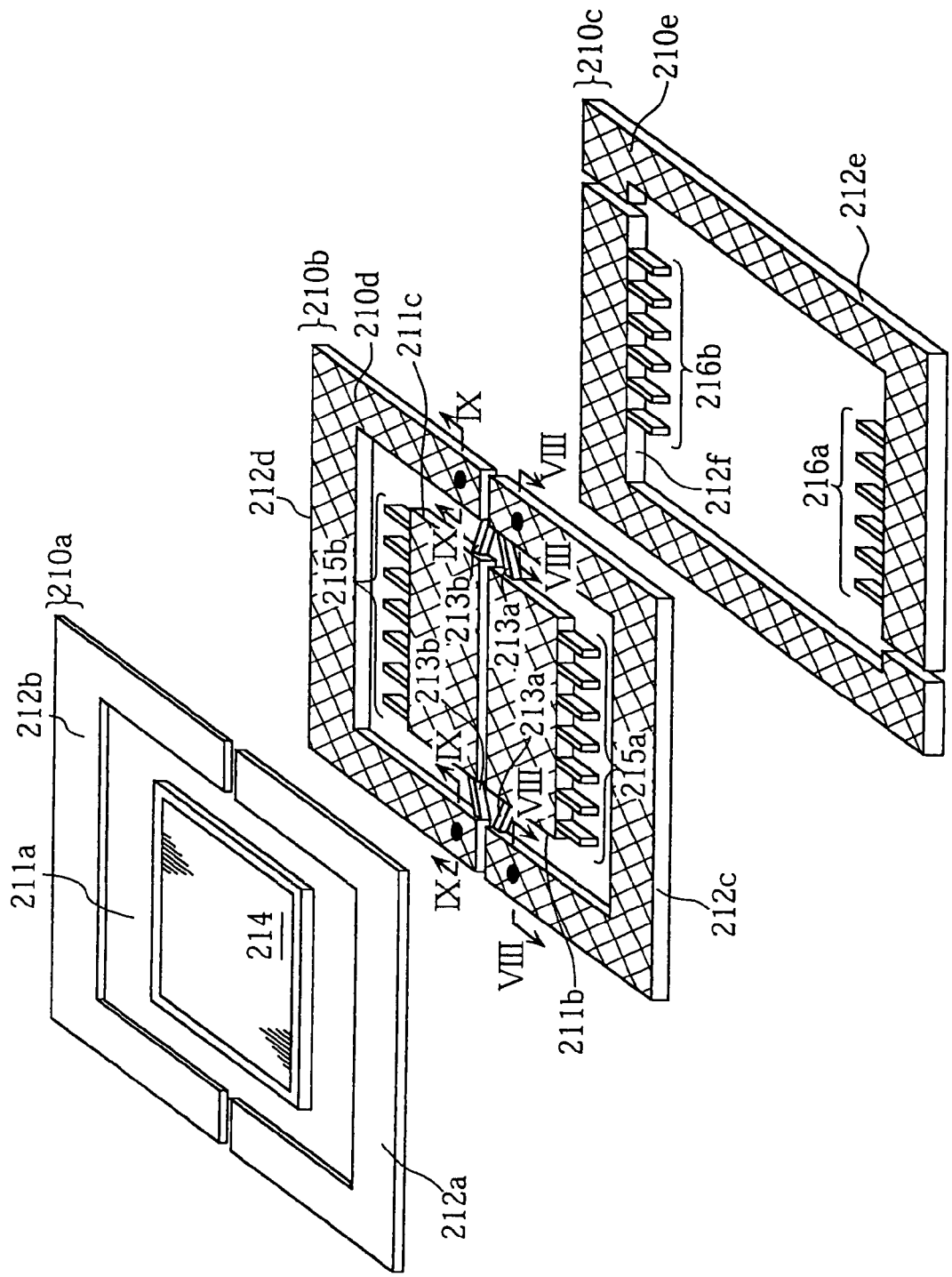
FIG. 7 is an exploded view of the micro-mirror element shown in FIG. 6.
Figure 8:
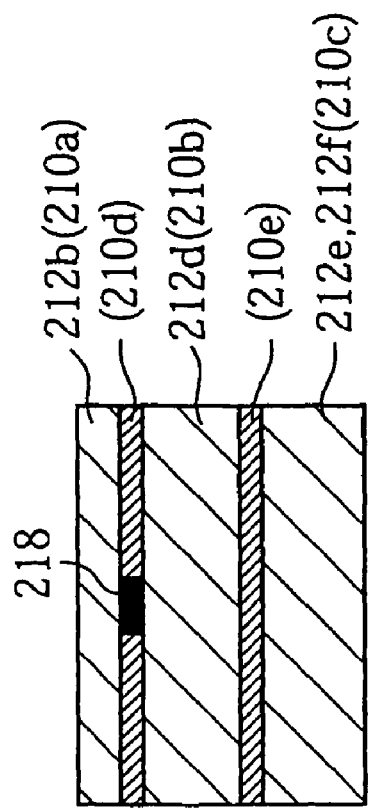
FIG. 8 is a cross-sectional view taken along the line VIII-VIII of FIG. 7.
Figure 9:
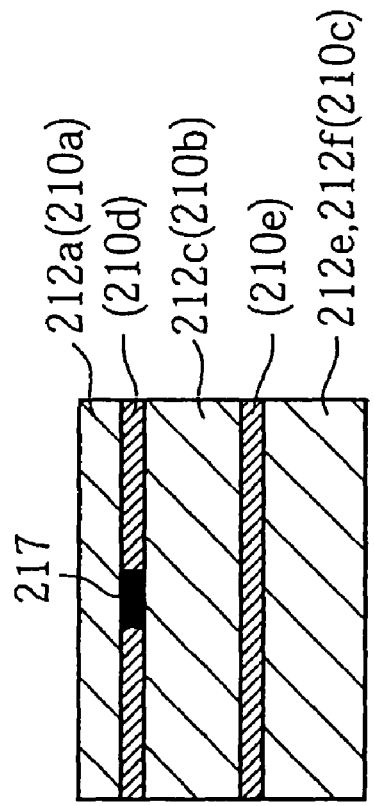
FIG. 9 is a cross-sectional view taken along the line IX-IX of FIG. 7.

FIG. 6 and FIG. 7 show a micro-mirror element X2 according to a second embodiment of the present invention. The micro-mirror element X2 is provided with a mirror 211, a frame 212 encompassing the mirror 211, and a pair of couplers 213 connecting the frame 212 and the mirror 211 to each other. The micro-mirror element X2 is formed in a material base substrate provided with multi-layered construction by means of the bulk micromachining technology such as the MEMS technology. The material substrate is provided with cumulative construction formed from a first silicon layer 210a doped with n type impurities such as P and As or p type impurities such as B for obtaining electroconductivity, a second silicon layer 210b, and a third silicon layer 210c, as well as a first insulation layer 210d and a second insulation layer 210e formed between the silicon layers. The multi-layer construction is shown in FIG. 8 and FIG. 9. The thickness of the first silicon layer 210a is, for example, 100 μm, and the thickness of the second silicon layer 210b and the thickness of the third silicon layer 210c are, for example, 100 μm. The first insulation layer 210d and the second insulation layer 210e are, for example, in any of the surfaces of the first-third silicon layers 210a-210c, formed from oxidized silicon grown by the oxidization method, and have a thickness of 1 μm. The material substrate is made to be appropriately multi-layered in the formation process of the micro-mirror element X2.

In the formation of the micro-mirror element X2, use is made of etching masks, depending on the state of the cumulative construction in the material substrate, such as an etching mask for covering a part corresponding to the mirror 211, an etching mask for covering a part corresponding to the frame 212, and etching masks for covering parts corresponding to the paired couplers 213. Each silicon layer is processed by means of Si etching or KOH wet Si etching and the like using the Deep RIE method. Unnecessary portions in the insulation layer are etched away. As a result, the mirror 211, the frame 212, and the set of couplers 213 of the element X2 are formed. In the illustrated example, the distance between the mirror 211 and the frame 212 is, for example, 10-200 μm.

The mirror 211, as shown in FIG. 7, is provided with an upper layer 211, and lower layers 211b and 211c. The upper layer 211a originates in the first silicon layer 210a. Lower layers 211b and 211c originate in the second silicon layer 210b. Between the upper layer 211a and the lower layers 211b, 211c passes an intervening first insulation layer 210d. In FIG. 7, the first insulation layer 210d is indicated by the cross-hatching on a portion originating in the second silicon layer 210b of the micro-mirror element X2.

To the upper layer mirror 211a of the mirror 211 is attached a mirror surface 214 used for reflecting light. The mirror surface 214 is formed by vapor deposition of a metallic film, for example. The lower layers 211b, 211c are provided with comb-tooth electrodes 215a and 215b, respectively. The comb-tooth electrodes 215a and 215b are respectively a part of the middle layers 211b and 211c, and originate in the second silicon layer 210b.

The frame 212, as shown in FIG. 7, is provided with upper layers 212a-212b, middle layers 212c-212d, and lower layers 212e-212f. The upper layers 212a, 212b originate in the first silicon layer 210a; the middle layers 212c, 212d originate in the second silicon layer 210b, and the lower layers 212e, 212f originate in the third silicon layer 210c. Between the upper layers 212a, 212b and the middle layers 212c, 212d, as seen in FIGS. 7-9, there is an intervening first insulation layer 210d. Between the middle layers 212c, 212d and the lower layers 212e, 212f, there is an intervening second insulation layer 210e. In FIG. 7, the second insulation layer 210e is indicated by the cross-hatching on a portion originating in the third silicon layer 210c of the mirror element X2.

The lower layers 212e, 212f of the frame 212 are provided with comb-tooth electrodes 216a and 216b, respectively. The comb-tooth electrodes 216a and 216b are respectively a part of lower layers 212e and 212f, and originate in the third silicon layer 210c. In the frame 212, the upper layer 212a and the middle layer 212c, as shown in FIG. 8, are electrically connected to each other by two plugs 217 passing through the first insulation layer 210d. The Plugs 217 are made, for example, of polysilicon, and is formed to be filled in between the upper layer 212a and the middle layer 212c. The upper layer 212b and the middle layer 212d, as shown in FIG. 9, are electrically connected to each other by two plugs 218 passing through the first insulation layer 210d. The plugs 218 is made, for example, of polysilicon, and is formed to be filled in between the upper layer 212b and the middle layer 212d.

Each coupler 213 connects the mirror 211 and the frame 212 to each other. The micro-mirror element X2 is constructed as a single axis type in which the movable unit or mirror 211 has one rotating axis A2 defined by a pair of couplers 213. In the illustrated example, each coupler 213 consists of two torsion bars 213a, 213b separated from each other.

The torsion bar 213a, originating in the second silicon layer 210b and made to be thinner than the second silicon layer 210b, is formed integral with the lower layer 211b of the mirror 210 and the middle layer 212c of the frame 212. Likewise, the torsion bar 213b, originating in the second silicon layer 210b and made to be thinner than the second silicon layer 210b, is formed integral with the lower layer 211c of the mirror 211 and the middle layer 212d of the frame 212.

The two torsion bars 213a, 213b determines the width of the coupler 213 (the measurement in the Y direction in FIG. 6). The spacing of the two torsion bars 213a, 213b becomes greater as the bars are closer to the mirror 211, but gradually becomes smaller as the bars are closer to the frame 212. Specific details are the same as those described above with reference to the torsion bars 113a, 113b of the micro-mirror element X1.

In the micro-mirror element X2 having such construction, when an electric potential is applied to the upper layer 212a of the frame 212, the electric potential is transmitted to the comb-tooth electrode 215a through the plugs 217, the middle layer 212c, the torsion bars 213a and the middle layer 211b of the mirror 211. Likewise, when an electric potential is applied to the upper layer 212b of the frame 212, the electric potential is transmitted to the comb-tooth electrode 215b through the plugs 218, the middle layer 212d, the torsion bars 213b and the middle layer 211c of the mirror 211.

In the state in which electric potential is applied to the electrode 215a of the mirror 211, when the electric potential is applied to the lower layer 212e of the frame 212 or to the comb-tooth electrode 216a, then electrostatic attraction or repulsion is generated between the comb-tooth electrode 215a and the comb-tooth electrode 216a. Likewise, in the state in which electric potential is applied to the comb-tooth electrode 215b of the mirror 211, when the electric potential is applied to the lower layer 212f of the frame 212 or to the comb-tooth electrode 216b, then electrostatic attraction or repulsion is generated between the comb-tooth electrode 215b and the comb-tooth electrode 216b. By means of the combined force of these electrostatic forces, the mirror 211 rotates around the rotating axis A2 as twisting the couplers 213.

In the micro-mirror element X2, the above-described drive mechanism actuates the mirror 211, namely the movable unit, thereby causing the mirror surface 214 to face in the desired direction. Thus, according to the micro-mirror element X2, it is possible to change the direction of light reflected by the mirror surface 214, as required.

In the micro-mirror element X2, the two torsion bars 213a, 213b included in a single coupler 213 are electrically separated from each other. With the torsion bars 213a, 213b spaced from each other, the mirror 211 and the frame 212, to which the torsion bars are connected, are provided with a conduction path in a manner such that no short-circuiting occurs between the torsion bars 213a and 213b. Owing to this, in the micro-mirror element X2, it is possible to transmit multiple electric potentials from the frame 212 to the mirror 211, and it is also possible to simultaneously transmit multiple electric potentials to the mirror 211. With such an arrangement, the micro-mirror element X2 is provided with a high degree of freedom relative to the state of rotational driving of the mirror 211 around the rotating axis A2 defined by the coupler 213, whereby complex operations with respect to the mirror 211 can be realized.

As described above with respect to the coupler 113 of the mirror element X1, the coupler 213 of the micro-mirror element X2 has a small twist resistance, while preventing the mirror 211 from unduly rotating about the normal N2.

In the mirror element X2 described above, a pair of comb-tooth electrodes 215a, 216a and a pair of comb-tooth electrodes 215a, 215b are provided for driving the mirror 211 or the movable unit. With such a comb-tooth mechanism, it is possible to cause the working direction of the electrostatic force generated between the electrodes to be directed generally perpendicularly to the rotational direction of the mirror 211. In this manner, no attraction voltage (threshold voltage for causing a sudden increase in the electrostatic force) occurs in driving the mirror 211, whereby the mirror 211 can be tilted with a great inclination angle. Advantageously, the comb-tooth electrodes are appropriate for driving the movable unit with high precision.

Figure 10:
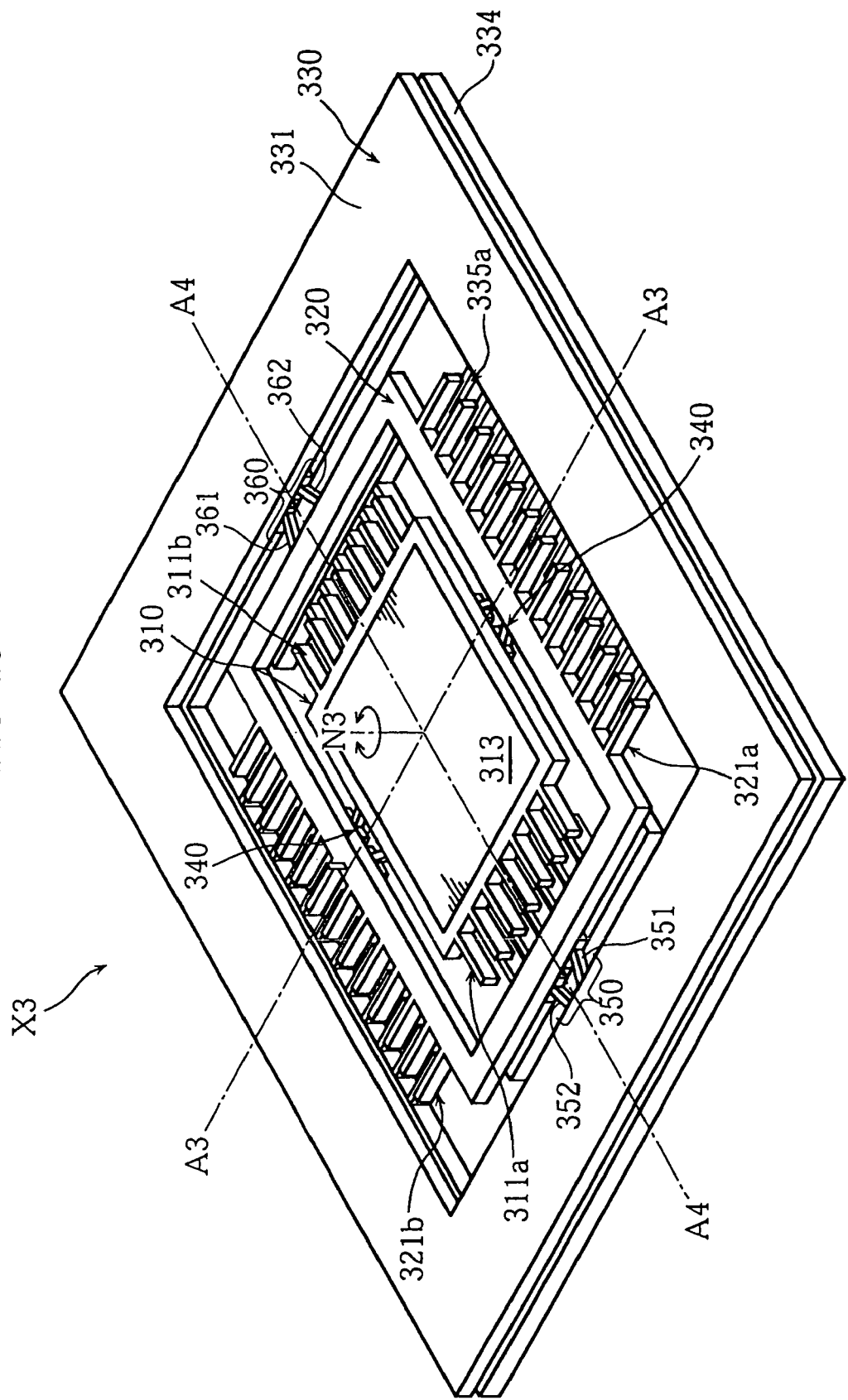
FIG. 10 is a perspective view showing a micro-mirror element according to a third embodiment of the present invention.

FIG. 10 and FIG. 11 show a micro-mirror element X3 according to a third embodiment of the present invention. The micro-mirror element X3 is provided with a mirror 310, an inner frame 320 surrounding the mirror 310, an outer frame 330 surrounding the inner frame 320, a pair of couplers 340 connecting the mirror 310 and the inner frame 320 to each other, and a pair of couplers 350 and 360 connecting the inner frame 320 and the outer frame 330 to each other. The paired couplers 340 define the rotating axis A3 of the rotational operation of the mirror 310 relative to the inner frame 320. The couplers 350 and 360 define the rotating axis A4 of the inner frame 320, and hence the mirror 310, relative to the outer frame 330. In the illustrated example, the rotating axis A3 and the rotating axis A4 intersect at right angles.

The micro-mirror element X3 is formed in a multi-layer material substrate by means of a bulk micromachining technology such as MEMS. The material substrate has a multi-layer structure consisting of a first silicon layer 301, a second silicon layer 302, a third silicon layer 303, a first insulation layer 304, and a second insulation layer 305, where the first to third silicon layers are made electroconductive by the doping of an n-type impurity such as P and As, or a p-type impurity such as B, and where the first and second insulation layers are disposed between these silicon layers. The multi-layer structure of this embodiment is shown in FIGS. 12-16. The first silicon layer 301 and the third silicon layer 303 each have a thickness of 100 μm, for example. The second silicon layer 302 has a thickness of 5 μm, for example. The first insulation layer 304 and the second insulation layer 305, each having a thickness of 1 μm for example, are made of silicon oxide which is grown on the first, the second or the third silicon layer 301-303 by the thermal oxidation method. According to the present invention, the material substrate may be appropriately multi-layered in the formation processing of the micro-mirror element X3.

To produce the micro-mirror element X3, appropriate use is made of an etching mask which encompasses locations corresponding to the mirror 310, and an etching mask which encompasses the location corresponding to the inner frame 320, and an etching mask corresponding to the outer frame 330, as well as an etching mask which encompasses the locations corresponding to the couplers 340, 350, and 360. Each of the silicon layers are processed by, for example, Si etching accomplished by means of the Deep RIE method, or the KOH wet Si etching. Nonessential portions are etched away from the first insulation layer 304 and the second insulation layer 305. As a result, with the micro-mirror element X3, formation is accomplished of a mirror 310, an inner frame 320, an outer frame 330, and couplers 340, 350, and 360. In the present embodiment, the offset distance between the mirror 310 and the inner frame 320 and the offset distance between the inner frame 310 and the outer frame 320 is, for example, 10-200 μm.

The mirror 310, as shown in FIG. 11, is provided with an upper layer 311 and four lower layers 312. FIG. 11 is an exploded plane surface diagram of the micro-mirror element X3. In FIG. 11, from the standpoint of clarification, the construction originating in the second silicon layer 302 is shown along with the construction originating in the first silicon layer 301 (shown by the broken line). The upper layer 311 originates in the first silicon layer 301, and the lower layer 312 originates in the second silicon layer 302. Between upper layer 311 and each of the lower layers 312, as shown in FIG. 11 and FIG. 12, there is an intervening first insulation layer 304. In FIG. 11, the first insulation layer 304 is indicated by the cross-hatching on the portion originating in the second silicon layer 302 of the micro-mirror element X3.

To the upper layer 311 of the mirror 310 is attached a mirror surface 313 for light reflection. The mirror surface 313 is formed through the vapor deposition of metallic film, for example. The upper layer 311, at the opposite ends thereof, is provided with a comb-tooth electrode 311a and a comb-tooth electrode 311b. The comb-tooth electrodes 311a and 311b are a part of the upper layer 311 and originate in the first silicon layer 301.

In the mirror 310, the upper layer 311 and each lower layer 312, as shown in FIG. 12, are electrically connected to each other by means of a plug 310a passing through the first insulation layer 304. The plug 310a is made, for example, of polysilicon, and formed to be filled between the upper layer 311 and the lower layer 312.

As shown in FIG. 11, the inner frame 320 is provided with an upper layer 321, four middle layers 323a, 323b, 324a, 324b, and lower layers 325, 326. The upper layer 321 originates in the first silicon layer 301, and the middle layers 322, 323a, 323b, 324a and 324b originate in the second silicon layer 302, and the lower layers 325 and 326 originate in the third silicon layer 303. As shown in FIGS. 11-16, there is a first insulation layer 304 intervening between the upper layer 321 and each of the middle layers 322, 323a, 323b, 324a, 324b. Likewise, there is a second insulation layer 305 intervening between the middle layers 323a, 323b, 324a, 324b and the lower layers 325, 326. In FIG. 11, the second insulation layer 305 is indicated by the cross-hatching on a portion originating in the third silicon layer 303 of the micro-mirror element X3.

The upper layer 321 of the inner frame 320 is provided with comb-tooth electrodes 321a and 321b. The comb-tooth electrodes 321a and 321b are a part of the upper layer 321, and originate in the first silicon layer 301. The lower layers 325 and 326 are respectively provided with comb-tooth electrodes 325a and 326a. The comb-tooth electrodes 325a and 325b are a part of the lower layer 325 and 326, respectively, and originate in the third silicon layer 303. The comb-tooth electrodes 325a and 326a are positioned downward of the comb-tooth electrodes 311a and 311b of the mirror 310, while also being arranged offset from the comb-tooth electrodes 311a and 312a so as not to interfere with the comb-tooth electrodes 311a, 312a when the mirror 310 rotates.

Figure 15:
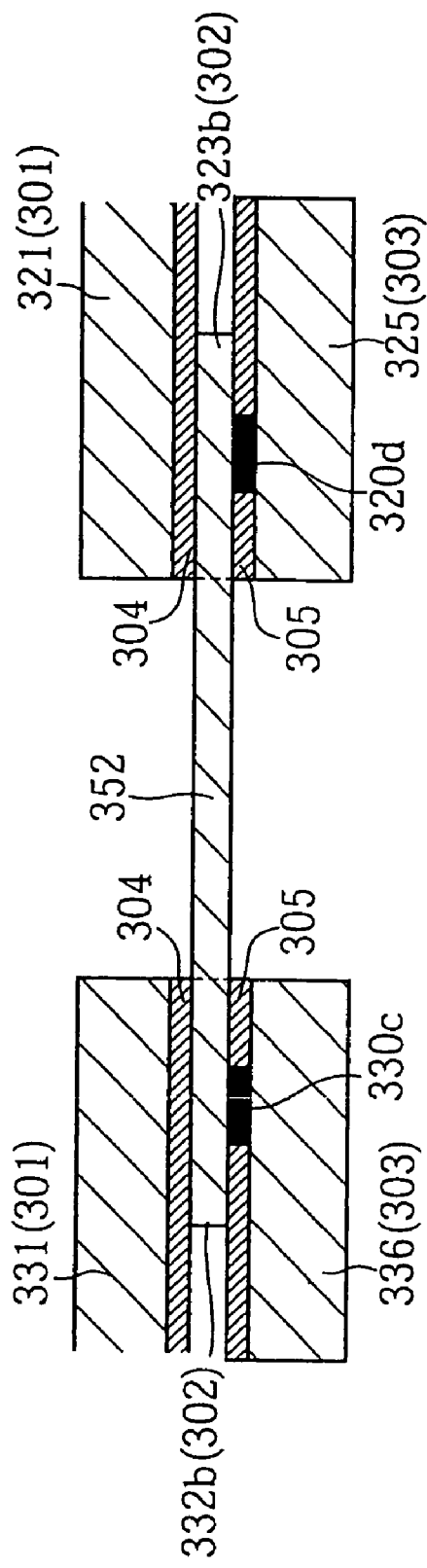
FIG. 15 is a cross-sectional view of another part of the micro-mirror element shown in FIG. 10.
Figure 16:
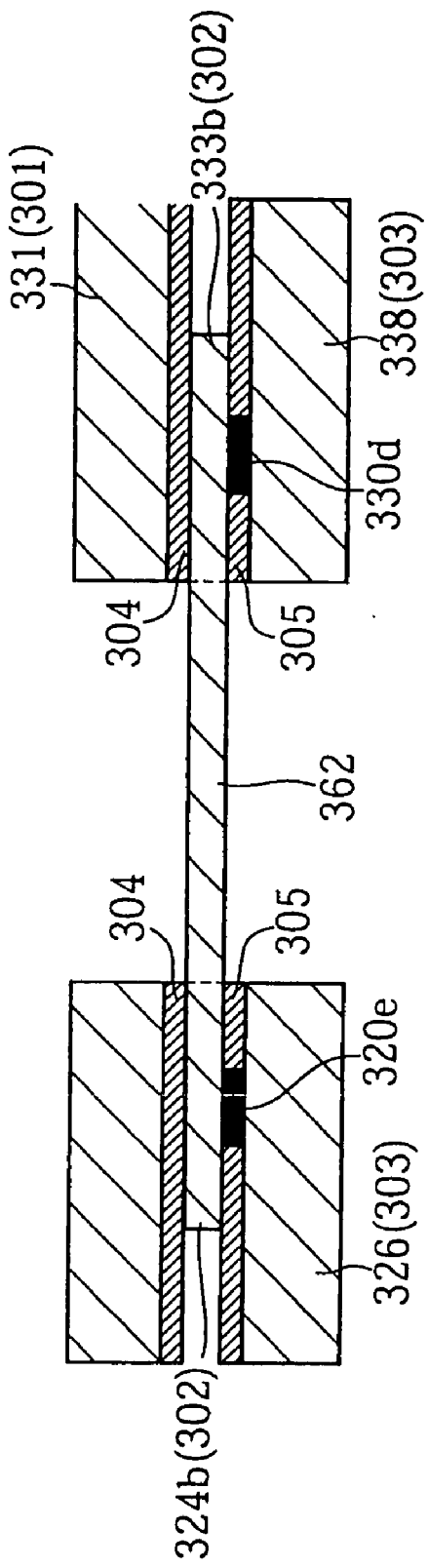
FIG. 16 is a cross-sectional view of another part of the micro-mirror element shown in FIG. 10.
Figure 17A:
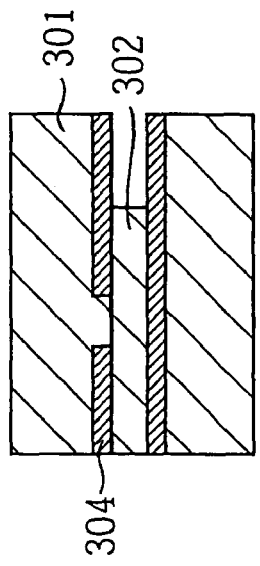
FIGS. 17a-17e show variations of conduction plugs.
Figure 17B:
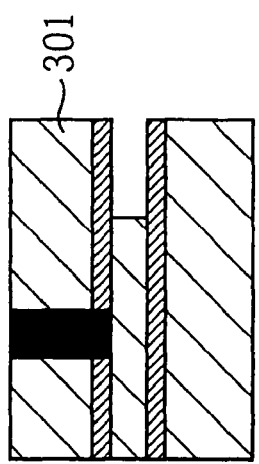

In the inner frame 320, as shown in FIG. 12, the upper layer 321 and each of the middle layers 322, as shown in FIG. 12, are electrically connected to each other by means of the plug 320a formed to be filled in between the upper layer 321 and the middle layer 322, passing through the first insulation layer 304. Likewise, the upper layer 321 and the middle layer 323a, as shown in FIG. 13, are electrically connected to each other by means of the plug 320b. Further, as shown in FIG. 14, the upper layer 321 and the middle layer 324a are connected to each other by means of the plug 320c. The middle layer 323b and the lower layer 325, as shown in FIG. 15, are electrically connected to each other by a plug 320d filled between the middle layer 323b and the lower layer 325, passing through the second insulation layer 305. In the same manner, the middle layer 324b and the lower layer 326, as shown in FIG. 16, are electrically connected to each other by a plug 320e. The plugs 320a-320e are formed, for example, from polysilicon. Instead of the form of the plugs 320a-320c shown in FIG. 12-FIG. 14, formation may be accomplished in the state shown in any of FIG. 17a and FIG. 17b. In FIG. 17a, the plug (daubed black), made by using a separate plug material, passes through the first silicon layer 301. In the example shown in FIG. 17b, without using a separate material for a plug, the formation of the plug is accomplished in a manner such that a hole formed in the first insulation layer 304 is filled with the material making the first silicon layer 301. Thus, the plug is formed in between the first silicon layer 301 and the second silicon layer 302 for connecting these layers to each other.

The outer frame 330, as shown in FIG. 11, is provided with an upper layer 331, middle layers 332a, 332b, 333a, 333b, and lower layers 334-338. The upper layer 331 originates in the first silicon layer 301, and the middle layers 332a, 332b, 333a, and 333b originate in the second silicon layer 302, and the lower layers 334-338 originate in the third silicon layer 303. Between the upper layer 331 and each of the middle layers 332a, 332b, 333a and 333b, as shown in FIGS. 11-16, there is an intervening first insulation layer 304. Between each of the middle layers 332a, 332b, 333a, 333b and the lower layers 334-338, there is an intervening second insulation layer 305.

The lower layers 335 and 337 of the outer frame 330 are provided with comb-tooth electrodes 335a and 337a, respectively. The comb-tooth electrodes 335a and 337a are a part of the lower layers 335 and 337, and originate in the third silicon layer 303. The comb-tooth electrodes 335a and 337a are positioned below the comb-tooth electrodes 321a and 321b of the inner frame 320, respectively, while also being arranged offset from the comb-tooth electrodes 321a, 321b so as not to interfere with these electrodes when the inner frame 320 rotates.

Figure 17E:
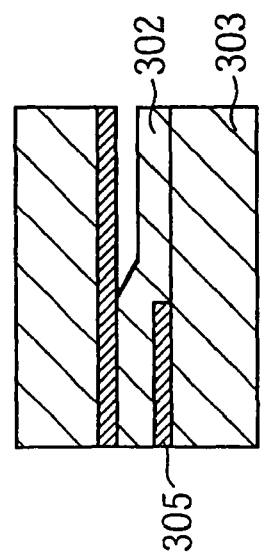
Figure 17C:
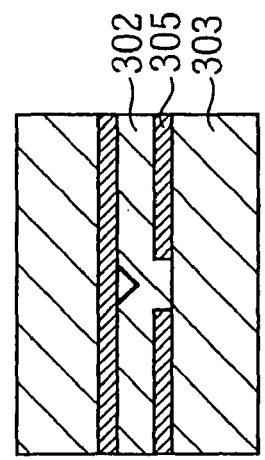
Figure 17D:
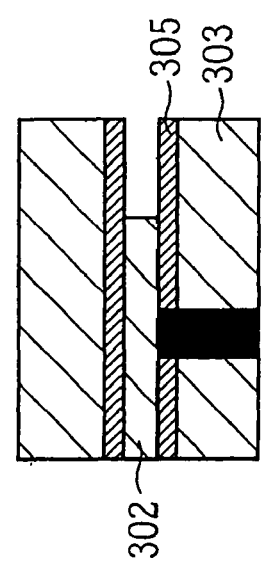
Figure 18:
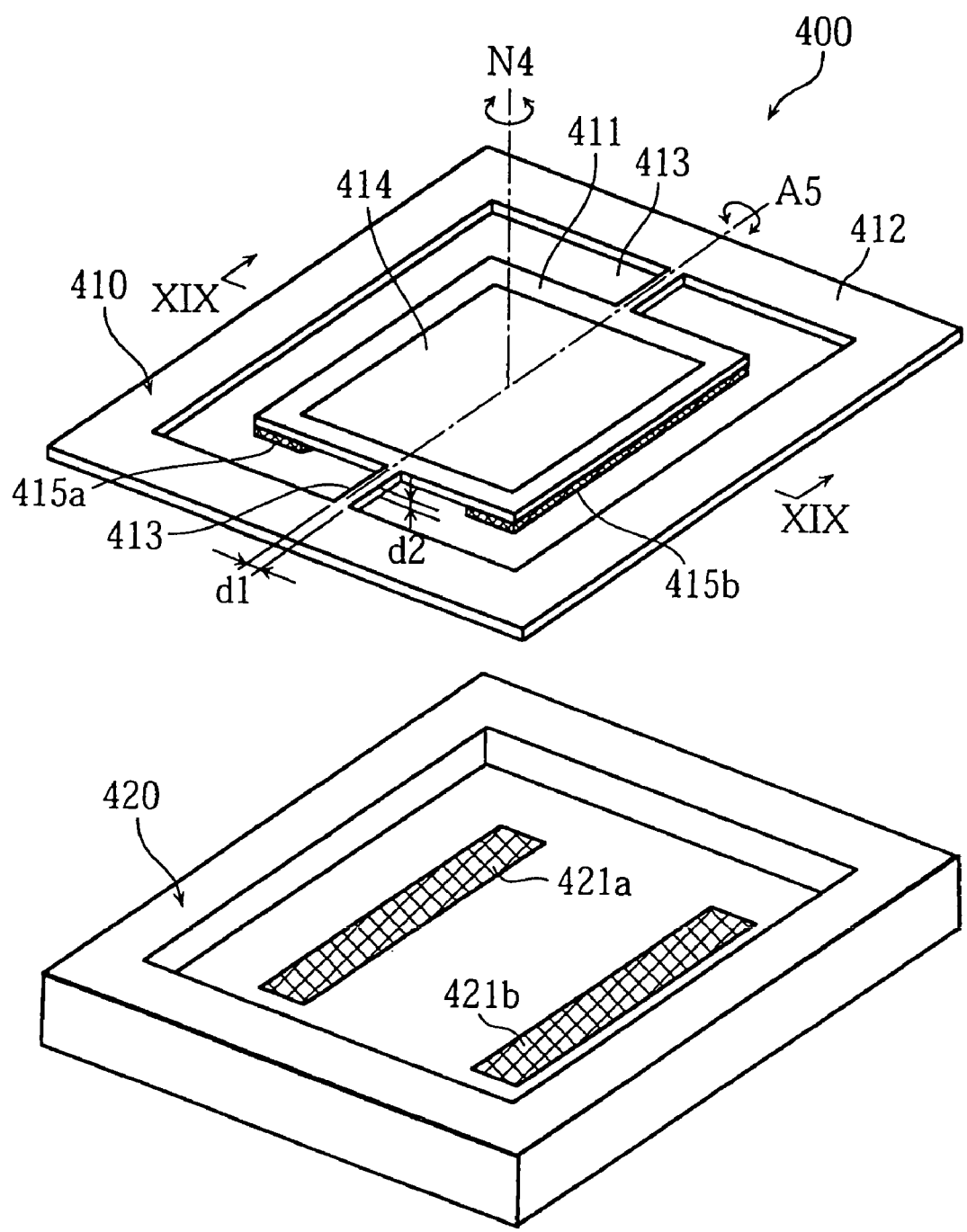
FIG. 18 is a perspective view showing a conventional micro-mirror element.
Figure 19:
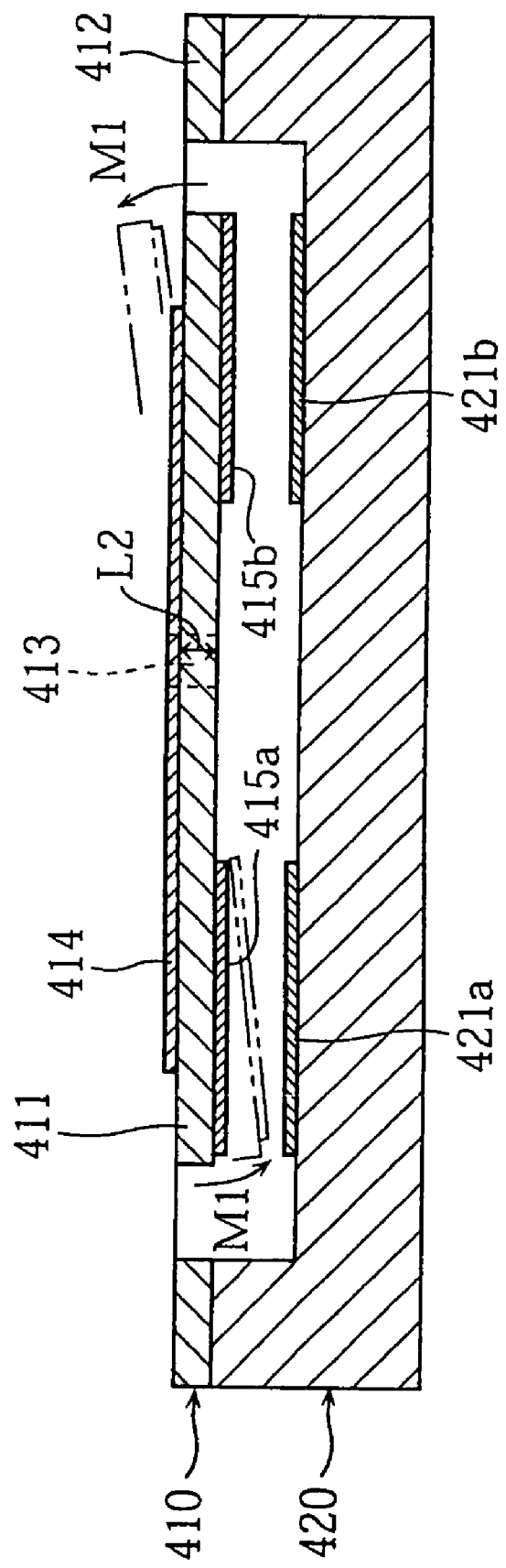
FIG. 19 is a cross-sectional view taken along the line XIX-XIX of FIG. 18.

In the outer frame 330, as shown in FIG. 13, the upper layer 331 and the middle layer 332a are connected to each other by a plug 330a filled between the upper layer 331 and the middle layer 332a, passing through the first insulation layer 304. In the same manner, the upper layer 331 and the middle layer 333a, as shown in FIG. 14, are electrically connected to each other by means of a plug 330b passing through the first insulation layer 304. Further, the middle layer 332b and the lower layer 336, as shown in FIG. 15, is electrically connected to each other by means of a plug 330c filled between the middle layer 332b and the lower layer 336, passing through the second insulation layer 305. Further, the middle layer 333b and the lower layer 338, as shown in FIG. 16, are electrically connected to each other by means of a plug 330d. The plugs 330a-330d are formed, for example, from polysilicon. According to the present invention, instead of the shape shown in FIGS. 12-14, any of the shapes shown in FIGS. 17c-17e may be formed for the plugs 320d, 320e. In the example shown in FIG. 17c, a separate plug material is used and formed into a plug (daubed black) passing through the third silicon layer 303. In the example shown in FIG. 17d, without separately using the plug material, a hole formed in the second insulation layer 305 is filled with the material making the second silicon layer 302, thereby producing the plug embedded in between the second silicon layer 302 and the third silicon layer 303 for connecting these layers to each other. In the example shown in FIG. 17e, no separate plug material is used, but a cutout is formed in the second insulation layer 305, and then the second silicon layer 302 is formed from above the second insulation layer 305. Thus, a plug is formed to connect the second silicon layer 302 and the third silicon layer 303.

Each coupler 340 connects the mirror 310 and the inner frame 320 to each other. In the present embodiment, each of the couplers consists of two torsion bars 341 spaced from each other.

The torsion bars 341, originating in the second silicon layer 302, are formed integral with the lower layer 312 of the mirror 310 and the middle layer 322 of the inner frame 320, as shown in FIGS. 11 and 12. The two torsion bars 341 determine the width of the coupler 340, and the spacing of the two torsion bars 341 is greater as the bars are closer to the mirror 310, but gradually becomes smaller as the bars are closer to the frame 320. Specific details are the same as those described above with respect to the torsion bars 113a, 113b of the micromirror element X1.

Each of the couplers 350 connect the inner frame 320 and the outer frame 330 to each other. With the present embodiment, each of the couplers 350 consists of the mutually offset two torsion bars 351 and 352. The torsion bar 351 originates in the second silicon layer 302, and as shown in FIG. 11 and FIG. 13, is formed integral with the middle layer 323a of the inner frame 320 and the middle layer 332a of the outer frame 330. The torsion bar 352 originates in the second silicon layer 302, and as shown in FIG. 11 and FIG. 15, is formed integral with the middle layer 323b of the inner frame 320 and the middle layer 332b of the outer frame 330.

The two torsion bars 351, 352 determine the width of the coupler 350. The spacing of the two torsion bars 351, 352 becomes greater as the bars are closer to the inner frame 320, but gradually becomes smaller as closer to the outer frame 330. Specific details are the same as those described above with reference to the torsion bars 113a, 113b of the micromirror element X1.

Each coupler 360 connects the inner frame 320 and the outer frame 330 to each other. In the present embodiment, each coupler 360 consists of the mutually offset two torsion bars 361 and 362. The torsion bar 361 originates in the second silicon layer 302, and, as shown in FIG. 11 and FIG. 14, is formed integral with the middle layer 324a of the inner frame 320 and the middle layer 333a of the outer frame 330. The torsion bar 362 originates in the second silicon layer 302, and as shown in FIG. 11 and FIG. 16, is formed integral with the middle layer 324b of the inner frame letter 320 and the middle layer 333b of the outer frame 330.

The two torsion bars 361, 362 determine the width of the coupler 360. The spacing of the two torsion bars 361, 362 becomes greater as the bars are closer to the inner frame 320, but gradually becomes smaller as closer to the outer frame 330. Specific details are the same as those described above with reference to the torsion bars 113a, 113b of the micromirror element X1.

In the above-described micro-mirror element X3, when an electric potential is applied to the upper layer 331 of the outer frame 330, the potential is transmitted to the upper layer 321 of the inner frame 320 or to the comb-tooth electrodes 321a, 321b through the plug 330a shown in FIG. 13, the middle layer 332a of the outer frame 330, the torsion bar 351, the middle layer 323a of the inner frame 320, the plug 32b, and further through the plug 330b shown in FIG. 14, the middle layer 333a of the outer frame 330, the torsion bar 361, the middle layer 324a of the inner frame 320, and the plug 320c. Still further, this potential is transmitted to the upper layer 311 of the mirror 310 or to the comb-tooth electrodes 311a, 311b through each plug 320a, connected to the upper layer 321 as shown in FIG. 12, the torsion bar 341 connected to the plug, the lower layer 312 of the mirror 310, and the plug 310a. Thus, when an electric potential is applied to the upper layer 331 of the outer frame 330, then the electric potential is transmitted to the comb-tooth electrodes 311a, 311b and the comb-tooth electrodes 311a, 311b.

When applied to the lower layer 336 of the outer frame 330, the electric potential is transmitted to the lower layer 325 of the inner frame 320 or to the comb-tooth electrode 325a through the plug 330c shown in FIG. 15, the middle layer 332b of the outer frame 330, the torsion bar 352, the middle layer 323b of the inner frame 320, and the plug 320d. In the same way, when applied to the lower layer 338 of the outer frame 330, the electric potential is transmitted to the lower layer 326 of the inner frame 320 or to the comb-tooth electrode 326a through the plug 330d shown in FIG. 16, the middle layer 333b of the outer frame 330, the torsion bar 362, the middle layer 324b of the inner frame 320, and the plug 320e.

With electric potential applied to the comb-tooth electrode 311a of the mirror 310, when electric potential is applied to the comb-tooth electrode 325a in the inner frame 320, electrostatic attraction or electrostatic repulsion is generated between the comb-tooth electrode 311a and the comb-tooth electrode 325a. Likewise, with electric potential applied to the comb-tooth electrode 311b in the mirror 310, when electric potential is applied to the comb-tooth electrode 326a in the inner frame 320a, electrostatic attractive force or repulsive force is generated between the comb-tooth electrode 311b and the comb-tooth electrode 326a. By means of these electrostatic forces, or a combination of these electrostatic forces, the mirror 310 rotates around the rotating axis A3, as twisting the paired couplers 340.

On the other hand, with electric potential applied to the comb electrode 321a in the inner frame 320, when electric potential is applied to the lower layer 335-comb electrode 335a in the outer frame 330, electrostatic attractive force or electrostatic repulsive force is generated between the comb electrode 321a and the comb electrode 335a. Likewise, with electric potential applied to the comb electrode 321b in the inner frame 320, when electric potential is applied to the lower layer 337 in the outer frame 330 or the comb-tooth electrode 337a, electrostatic attractive force or electrostatic repulsive force is generated between the comb-tooth electrode 321b and the comb-tooth electrode 337a. By means of the electrostatic force or the combined force of the electrostatic forces, the inner frame 320, together with the mirror 310, is rotated about the rotating axis A4 as twisting the paired couplers 350 and 360.

In the micro-mirror element X3, the above-described drive mechanism actuates the mirror 310 and the movable unit including the inner frame 320 to cause the mirror surface 313 of the mirror 310 to be directed in the desired direction. Thus, with the micro-mirror element X3, it is possible to change the direction of light reflected on the mirror surface 313.

In the micro-mirror element X3, the two torsion bars 351, 352 of the coupler 350 are electrically separated from each other. The torsion bars 351, 352 being mutually offset, the inner frame 320 and the outer frame 330, to which the torsion bars are connected, are formed with a conduction path in a manner such that no short-circuiting occurs between the torsion bars 351 and 352. At the same time, the two torsion bars 361 and 362 of the coupler 360 are electrically separated from each other. As a result, the torsion bars 351, 352 are spaced from each other, and the inner frame 320 and the outer frame 330 are provided with conduction paths that cause no short-circuiting to occur between the torsion bars 361 and 362. Owing to this, in the micro-mirror element X3, it is possible to provide a plurality of potential-transmitting ways between the outer frame 320 and the movable unit, whereby different potentials can be applied simultaneously to the movable unit. With such an arrangement, the micro-mirror element X3 is provided with a high degree of freedom in relation to the state of driving the movable unit, including the mirror 310 and the inner frame 320, and therefore complex operations in the movable unit can be realized. As a result, the micro-mirror element X3 appropriately functions as a dual axis type micro-mirror element.

The coupler 340 of the micro-mirror element X3, in the same manner as described with relation to the coupler 113 of the micro-mirror element X1, has a small twist resistance, while being capable of preventing the mirror 310 from unduly rotating around its normal N3. Likewise, the couples 350, 360 each have a small twist resistance, while being capable of preventing the inner frame 320 and hence the mirror 310 from unduly rotating about its normal N3.

Further, the micro-mirror element X3 is provided with a pair of comb-tooth electrodes 311a and 325a as well as a pair of comb-tooth electrodes 311b and 326a for the purpose of driving the mirror 310. Along with this, the micro-mirror element X3 is provided with a pair of comb-tooth electrodes 321a, 335a as well as a pair of comb-tooth electrodes 321b, 336a for the purpose of driving the inner frame 320. As in the above-described micro-mirror element X2, the comb-tooth electrode mechanism is appropriate for driving the movable unit with a high degree of precision.

The invention claimed is:

1. A micro-actuation element, comprising:
a movable unit,
a support frame and
a coupler for connecting the movable unit and the support frame,
the movable unit, the support frame and the coupler being integrally formed in a material substrate with a multi-layer structure comprising a plurality of electroconductive layers and insulation layers arranged between the electroconductive layers, the electroconductive layers including a core conduction layer,
the movable unit comprising a first structure originating in the core conduction layer,
the frame comprising a second structure originating in the core conduction layer and a third structure originating in an electroconductive layer connected to the core conduction layer via the insulation layer in the material substrate, at least a part of the third structure and a part of the second structure being connected to each other via a conduction plug passing through the insulation layer intervening between the third structure and the second structure,
the coupler comprising a plurality of electrically separated torsion bars originating in the core conduction layer and continuously connected to the first structure and the second structure.

2. The micro-actuation element according to claim 1, wherein the movable unit comprises a movable core portion, a relay frame connected to the support frame by the coupler, and a relay coupler connecting the movable core portion and the relay frame.

3. The micro-actuation element according to claim 2, wherein the movable core portion comprises a fourth structure originating in the core conduction layer,
the relay frame including the first structure, the relay coupler including a plurality of electrically separated torsion bars that originate in the core conduction layer and are connected continuously to the fourth structure and the first structure.

4. The micro-actuation element according to claim 2, wherein the relay coupler includes two relay torsion bars spaced in a width direction, the two relay torsion bars having spacing that becomes greater as the bars are closer to the movable core portion.

5. The micro-actuation element according to claim 2, wherein the movable core portion includes a first comb-tooth electrode, the relay frame including a second comb-tooth electrode for moving the movable core portion by electrostatic force generated in cooperation with the first comb-tooth electrode.

6. The micro-actuation element according to claim 1, wherein the movable unit includes a first comb-tooth electrode, the support frame including a second comb-tooth electrode for moving the movable unit by electrostatic force generated in cooperation with the first comb-tooth electrode.

7. The micro-actuation element according to claim 1, further comprising a base facing the movable unit, wherein the base is provided with a flat electrode facing the movable unit.

8. The micro-actuation element according to claim 7, wherein the movable unit is provided with a flat electrode facing the flat electrode formed on the base.

9. The micro-actuation element according to claim 1, further comprising a base facing the movable unit, wherein the movable unit is provided with a first electromagnetic coil, the base being provided with a second electromagnetic coil or a magnet for moving the movable unit by electromagnetic force generated in cooperation with the first electromagnetic coil.

10. The micro-actuation element according to claim 1, further comprising a base facing the movable unit, wherein the movable unit is provided with a magnet, the base being provided with an electromagnetic coil for moving the movable unit by electromagnetic force generated in cooperation with the magnet.

11. The micro-actuation element according to claim 1, wherein the movable unit further includes a third structure originating in an electroconductive layer connected to the core conduction layer via the insulation layer in the material substrate, and wherein at least a part of the fourth structure and a part of the first structure are connected to each other via a conduction plug passing through the insulation layer intervening between the third and the first structures.

12. The micro-actuation element according to claim 1, wherein the coupler includes two torsion bars spaced from each other in a width direction, the two torsion bars having spacing that becomes greater as the bars are closer to the movable unit.

13. The micro-actuation element according to claim 12, wherein inequalities $0<Wf<L$ and $Wf<Wm<Wf+4L$ are satisfied, where Wf is spacing at the frame, Wm is spacing at the movable unit, and L is a distance between the movable unit and the frame at a position of the coupler.

14. A micro-actuation element, comprising:
a movable unit;
a support frame; and
a coupler for connecting the movable unit and the support frame, the movable unit, the support frame and the coupler being integrally formed in a material substrate with a multi-layer structure comprising a plurality of electroconductive layers and insulation layers arranged between the electroconductive layers, the electroconductive layers including a core conduction layer,
the movable unit comprising a first structure originating in the core conduction layer, the frame comprising a second structure originating in the core conduction layer, the coupler comprising a plurality of electrically separated torsion bars originating in the core conduction layer and continuously connected to the first structure and the second structure, wherein the coupler includes two torsion bars spaced from each other in a width direction, the two torsion bars having spacing that becomes greater as the bars are closer to the movable unit.

15. The micro-actuation element according to claim 14, wherein inequalities $0<Wf<L$ and $Wf<Wm<Wf+4L$ are satisfied, where Wf is spacing at the frame, Wm is spacing at the movable unit, and L is a distance between the movable unit and the frame at a position of the coupler.

16. A micro-actuation element comprising a movable unit, a support frame and a coupler for connecting these, the unit, the frame and the coupler being integrally formed in a material substrate having a multi-layer structure that includes a first electroconductive layer, a second electroconductive layer, a third electroconductive layer, a first insulation layer intervening between the first and the second electroconductive layers, and a second insulation layer intervening between the second and the third electroconductive layers, the movable unit including a first structure originating in the second electroconductive layer, the frame including a second structure originating in the second electroconductive layer, a third structure originating in the first electroconductive layer and a fourth structure originating in the third electroconductive layer, at least a part of the third structure and a part of the fourth structure being connected to each other by a first conduction plug passing through the first insulation layer intervening between the third structure and the second structure, another part of the second structure and at least one part of the fourth structure being connected to each other by a second conduction plug passing through the second insulation layer intervening between the second structure and the fourth structure, the coupler including a plurality of electrically separated torsion bars that originate in the second electroconductive layer and are continuously connected to the first structure and the second structure.

17. The micro-actuation element according to claim 16, wherein the movable unit further includes a fifth structure originating in the first electroconductive layer, and wherein at least a part of the fifth structure and a part of the first structure are connected to each other by a conduction plug passing through the first insulation layer intervening between the fifth and the first structures.

* * * * *